US011483745B2

(12) United States Patent
Singh et al.

(10) Patent No.: US 11,483,745 B2
(45) Date of Patent: Oct. 25, 2022

(54) BASEBAND AND METHOD FOR SELECTING A CO-ORDINATION SET OF NEIGHBORING BASEBANDS IN A CENTRALIZED RADIO ACCESS NETWORK (C-RAN)

(71) Applicant: Telefonaktiebolaget LM Ericsson (publ), Stockholm (SE)

(72) Inventors: Namit Singh, McKinney, TX (US); Narendra Tilwani, McKinney, TX (US); Miroslav Budic, Murphy, TX (US); Adrian Ha, Plano, TX (US)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 238 days.

(21) Appl. No.: 16/956,136

(22) PCT Filed: Dec. 19, 2017

(86) PCT No.: PCT/IB2017/058123
§ 371 (c)(1),
(2) Date: Jun. 19, 2020

(87) PCT Pub. No.: WO2019/122962
PCT Pub. Date: Jun. 27, 2019

(65) Prior Publication Data

US 2020/0329406 A1 Oct. 15, 2020

(51) Int. Cl.
*H04W 36/00* (2009.01)
*H04B 7/024* (2017.01)
*H04L 5/00* (2006.01)

(52) U.S. Cl.
CPC ........ *H04W 36/0058* (2018.08); *H04B 7/024* (2013.01); *H04L 5/0035* (2013.01); *H04W 36/0069* (2018.08); *H04W 36/00835* (2018.08)

(58) Field of Classification Search
CPC ......... H04W 36/0058; H04W 36/0069; H04W 36/00835; H04B 7/024; H04L 5/0035; H04L 5/0032; H04L 5/001; H04J 11/0053
See application file for complete search history.

(56) References Cited

U.S. PATENT DOCUMENTS

2015/0139100 A1* 5/2015 Grob-Lipski ......... H04W 16/02 370/329
2017/0230131 A1* 8/2017 Kronestedt ..... H04W 36/00835
2017/0238209 A1* 8/2017 Cui ..................... H04W 88/085 370/230

FOREIGN PATENT DOCUMENTS

EP 3068159 A1 9/2016

* cited by examiner

*Primary Examiner* — Ricky Q Ngo
*Assistant Examiner* — Stephen N Steiner

(57) ABSTRACT

A baseband and method in a centralized radio access network (C-RAN) are described herein that are configured to dynamically select an "X" number of neighboring basebands to be assigned to a co-ordination set of the baseband based at least in part on measurement reports received from a plurality of user equipments (UEs).

20 Claims, 13 Drawing Sheets

600

| SOURCE BASEBAND (604) | SOURCE CELL (606) | NEIGHBOR BASEBAND (608) | NEIGHBOR CELL FREQUENCY (610) | RTT TIME (612) | MEASUREMENT REPORT INTENSITY (614) |
|---|---|---|---|---|---|
| $602_3$ BASEBAND-1 | CELL-1 | BASEBAND-2 | CELL-5, SAME | 34 | 123 |
| BASEBAND-1 | CELL-1 | BASEBAND-2 | CELL-11, SAME | 32 | 456 |
| BASEBAND-1 | CELL-1 | BASEBAND-2 | CELL-12, DIFFERENT | 34 | 324 |
| $602_{22}$ BASEBAND-1 | CELL-1 | BASEBAND-4 | CELL-7, SAME | 54 | 435 |
| BASEBAND-1 | CELL-2 | BASEBAND-4 | CELL-9, SAME | 42 | 112 |
| $602_{N-1}$ BASEBAND-1 | CELL-3 | BASEBAND-6 | CELL-9, SAME | 43 | 76 |
| ∘∘∘ | ∘∘∘ | ∘∘∘ | ∘∘∘ | ∘∘∘ | ∘∘∘ |
| BASEBAND-1 | CELL-3 | BASEBAND-7 | CELL-12, DIFFERENT | 42 | 45 |
| BASEBAND-1 | CELL-2 | BASEBAND-7 | CELL-14, DIFFERENT | 52 | 156 |
| $602_N$ BASEBAND-1 | CELL-3 | BASEBAND-7 | CELL-10, SAME | 54 | 195 |

600

| | 604 SOURCE BASEBAND | 606 SOURCE CELL | 608 NEIGHBOR BASEBAND | 610 NEIGHBOR CELL FREQUENCY | 612 RTT TIME | 614 MEASUREMENT REPORT INTENSITY |
|---|---|---|---|---|---|---|
| $602_1$ | BASEBAND-1 | CELL-1 | BASEBAND-1 | CELL-2, SAME | | |
| $602_2$ | BASEBAND-1 | CELL-1 | BASEBAND-1 | CELL-3, SAME | | |
| $602_3$ | BASEBAND-1 | CELL-1 | BASEBAND-2 | CELL-5, SAME | | |
| $602_4$ | BASEBAND-1 | CELL-1 | BASEBAND-3 | CELL-6, DIFFERENT | | |
| | ⋮ | ⋮ | ⋮ | ⋮ | | |
| $602_{20}$ | BASEBAND-1 | CELL-2 | BASEBAND-1 | CELL-1, SAME | | |
| $602_{21}$ | BASEBAND-1 | CELL-2 | BASEBAND-1 | CELL-3, SAME | | |
| $602_{22}$ | BASEBAND-1 | CELL-2 | BASEBAND-4 | CELL-7, SAME | | |
| $602_{23}$ | BASEBAND-1 | CELL-2 | BASEBAND-5 | CELL-8, DIFFERENT | | |
| | ⋮ | ⋮ | ⋮ | ⋮ | | |
| $602_{N-3}$ | BASEBAND-1 | CELL-3 | BASEBAND-1 | CELL-1, SAME | | |
| $602_{N-2}$ | BASEBAND-1 | CELL-3 | BASEBAND-1 | CELL-2, SAME | | |
| $602_{N-1}$ | BASEBAND-1 | CELL-3 | BASEBAND-6 | CELL-9, SAME | | |
| $602_N$ | BASEBAND-1 | CELL-3 | BASEBAND-7 | CELL-10, DIFFERENT | | |

| | 604 SOURCE BASEBAND | 606 SOURCE CELL | 608 NEIGHBOR BASEBAND | 610 NEIGHBOR CELL FREQUENCY | 612 RTT TIME | 614 MEASUREMENT REPORT INTENSITY |
|---|---|---|---|---|---|---|
| $602_1$ | ~~BASEBAND-1~~ | ~~CELL-1~~ | ~~BASEBAND-1~~ | ~~CELL-2, SAME~~ | | |
| $602_2$ | ~~BASEBAND-1~~ | ~~CELL-1~~ | ~~BASEBAND-1~~ | ~~CELL-3, SAME~~ | | |
| $602_3$ | BASEBAND-1 | CELL-1 | BASEBAND-2 | CELL-5, ~~SAME~~ | | |
| $602_4$ | BASEBAND-1 | CELL-1 | BASEBAND-3 | CELL-6, DIFFERENT | | |
| | ⋮ | ⋮ | ⋮ | ⋮ | | |
| $602_{20}$ | ~~BASEBAND-1~~ | ~~CELL-2~~ | ~~BASEBAND-1~~ | ~~CELL-1, SAME~~ | | |
| $602_{21}$ | ~~BASEBAND-1~~ | ~~CELL-2~~ | ~~BASEBAND-1~~ | ~~CELL-3, SAME~~ | | |
| $602_{22}$ | BASEBAND-1 | CELL-2 | BASEBAND-4 | CELL-7, SAME | | |
| $602_{23}$ | BASEBAND-1 | CELL-2 | BASEBAND-5 | CELL-8, DIFFERENT | | |
| | ⋮ | ⋮ | ⋮ | ⋮ | | |
| $602_{N-3}$ | ~~BASEBAND-1~~ | ~~CELL-3~~ | ~~BASEBAND-1~~ | ~~CELL-1, SAME~~ | | |
| $602_{N-2}$ | ~~BASEBAND-1~~ | ~~CELL-3~~ | ~~BASEBAND-1~~ | ~~CELL-2, SAME~~ | | |
| $602_{N-1}$ | BASEBAND-1 | CELL-3 | BASEBAND-6 | CELL-9, SAME | | |
| $602_N$ | BASEBAND-1 | CELL-3 | BASEBAND-7 | CELL-10, DIFFERENT | | |

| | SOURCE BASEBAND (604) | SOURCE CELL (606) | NEIGHBOR BASEBAND (608) | NEIGHBOR CELL FREQUENCY (610) | RTT TIME (612) | MEASUREMENT REPORT INTENSITY (614) |
|---|---|---|---|---|---|---|
| $602_1$ | ~~BASEBAND-1~~ | ~~CELL-1~~ | ~~BASEBAND-1~~ | ~~CELL-2, SAME~~ | | |
| $602_2$ | ~~BASEBAND-1~~ | ~~CELL-1~~ | ~~BASEBAND-1~~ | ~~CELL-3, SAME~~ | | |
| $602_3$ | BASEBAND-1 | CELL-1 | BASEBAND-2 | CELL-5, SAME | 34 | |
| $602_4$ | ~~BASEBAND-1~~ | ~~CELL-1~~ | ~~BASEBAND-3~~ | ~~CELL-6, DIFFERENT~~ | ~~67~~ | |
| | ⋮ | ⋮ | ⋮ | ⋮ | | |
| $602_{20}$ | ~~BASEBAND-1~~ | ~~CELL-2~~ | ~~BASEBAND-1~~ | ~~CELL-1, SAME~~ | | |
| $602_{21}$ | ~~BASEBAND-1~~ | ~~CELL-2~~ | ~~BASEBAND-1~~ | ~~CELL-3, SAME~~ | | |
| $602_{22}$ | BASEBAND-1 | CELL-2 | BASEBAND-4 | CELL-7, SAME | 42 | |
| $602_{23}$ | ~~BASEBAND-1~~ | ~~CELL-2~~ | ~~BASEBAND-5~~ | ~~CELL-8, DIFFERENT~~ | ~~76~~ | |
| | ⋮ | ⋮ | ⋮ | ⋮ | | |
| $602_{N-3}$ | ~~BASEBAND-1~~ | ~~CELL-3~~ | ~~BASEBAND-1~~ | ~~CELL-1, SAME~~ | | |
| $602_{N-2}$ | ~~BASEBAND-1~~ | ~~CELL-3~~ | ~~BASEBAND-1~~ | ~~CELL-2, SAME~~ | | |
| $602_{N-1}$ | BASEBAND-1 | CELL-3 | BASEBAND-6 | CELL-9, SAME | 43 | |
| $602_N$ | BASEBAND-1 | CELL-3 | BASEBAND-7 | CELL-10, DIFFERENT | 54 | |

| 604 SOURCE BASEBAND | 606 SOURCE CELL | 608 NEIGHBOR BASEBAND | 610 NEIGHBOR CELL FREQUENCY | 612 RTT TIME | 614 MEASUREMENT REPORT INTENSITY |
|---|---|---|---|---|---|
| $602_3$ BASEBAND-1 | CELL-1 | BASEBAND-2 | CELL-5, SAME | 34 | 123 |
| BASEBAND-1 | CELL-1 | BASEBAND-2 | CELL-11, SAME | 32 | 456 |
| BASEBAND-1 | CELL-1 | BASEBAND-2 | CELL-12, DIFFERENT | 34 | 324 |
| $602_{22}$ BASEBAND-1 | CELL-1 | BASEBAND-4 | CELL-7, SAME | 54 | 435 |
| BASEBAND-1 | CELL-2 | BASEBAND-4 | CELL-9, SAME | 42 | 112 |
| $602_{N-1}$ BASEBAND-1 | CELL-3 | BASEBAND-6 | CELL-9, SAME | 43 | 76 |
| ∘ ∘ ∘ | ∘ ∘ ∘ | ∘ ∘ ∘ | ∘ ∘ ∘ | ∘ ∘ ∘ | ∘ ∘ ∘ |
| BASEBAND-1 | CELL-3 | BASEBAND-7 | CELL-12, DIFFERENT | 42 | 45 |
| BASEBAND-1 | CELL-2 | BASEBAND-7 | CELL-14, DIFFERENT | 52 | 156 |
| $602_N$ BASEBAND-1 | CELL-3 | BASEBAND-7 | CELL-10, SAME | 54 | 195 |

| 604 SOURCE BASEBAND | 608 NEIGHBOR BASEBAND | 614 MEASUREMENT REPORT INTENSITY |
|---|---|---|
| BASEBAND-1 | BASEBAND-2 | 903 |
| BASEBAND-1 | BASEBAND-4 | 547 |
| BASEBAND-1 | BASEBAND-6 | 76 |
| ∘ ∘ ∘ | ∘ ∘ ∘ | ∘ ∘ ∘ |
| BASEBAND-1 | BASEBAND-7 | 396 |

| SOURCE BASEBAND (604) | NEIGHBOR BASEBAND (608) | MEASUREMENT REPORT INTENSITY (SAME, DIFFERENT) (614) |
|---|---|---|
| BASEBAND-1 | BASEBAND-2 | (579,324) |
| BASEBAND-1 | BASEBAND-4 | (547,0) |
| BASEBAND-1 | BASEBAND-6 | (76,0) |
| ∘ ∘ ∘ | ∘ ∘ ∘ | ∘ ∘ ∘ |
| BASEBAND-1 | BASEBAND-7 | (195,201) |

| SOURCE BASEBAND (604) | NEIGHBOR BASEBAND (608) | MEASUREMENT REPORT INTENSITY (614) |
|---|---|---|
| BASEBAND-1 | BASEBAND-2 | 426 |
| BASEBAND-1 | BASEBAND-4 | 219 |
| BASEBAND-1 | BASEBAND-6 | 30 |
| ∘ ∘ ∘ | ∘ ∘ ∘ | ∘ ∘ ∘ |
| BASEBAND-1 | BASEBAND-7 | 199 |

FIG. 6D4

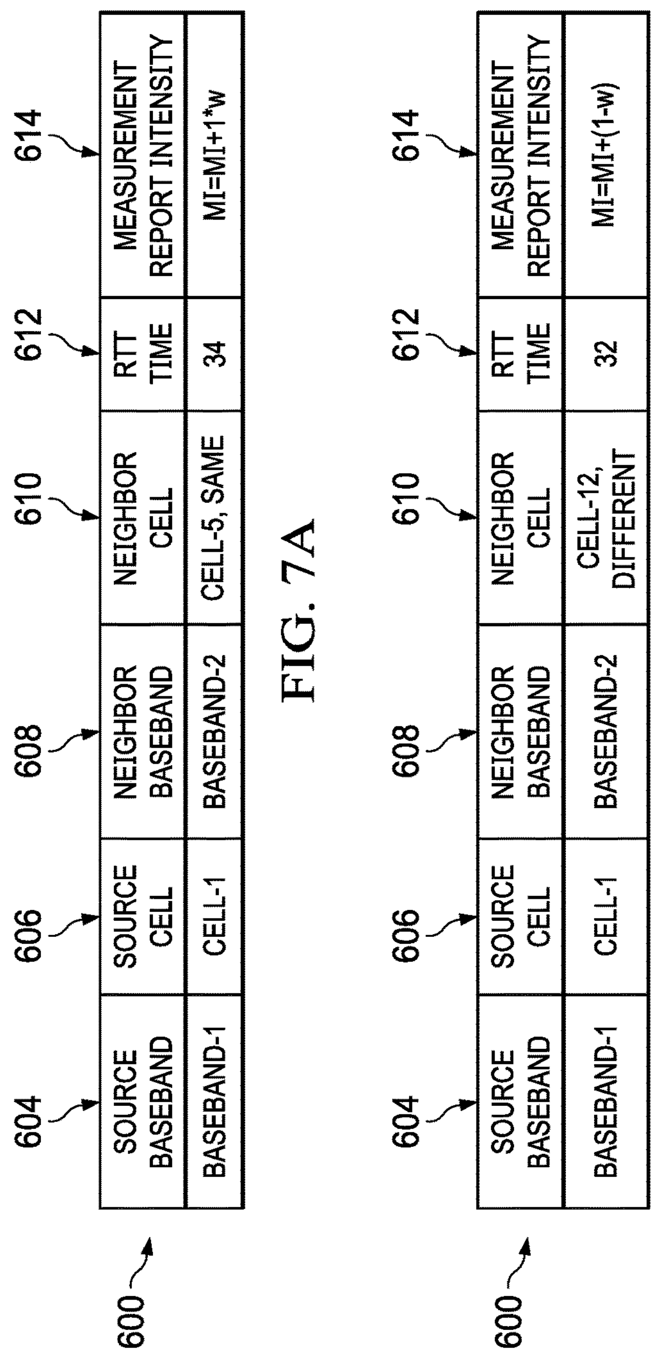
| SOURCE BASEBAND | SOURCE CELL | NEIGHBOR BASEBAND | NEIGHBOR CELL | RTT TIME | MEASUREMENT REPORT INTENSITY |
|---|---|---|---|---|---|
| BASEBAND-1 | CELL-1 | BASEBAND-2 | CELL-5, SAME | 34 | MI=MI+1*w |
FIG. 7A
| SOURCE BASEBAND | SOURCE CELL | NEIGHBOR BASEBAND | NEIGHBOR CELL | RTT TIME | MEASUREMENT REPORT INTENSITY |
|---|---|---|---|---|---|
| BASEBAND-1 | CELL-1 | BASEBAND-2 | CELL-12, DIFFERENT | 32 | MI=MI+(1-w) |
FIG. 7B
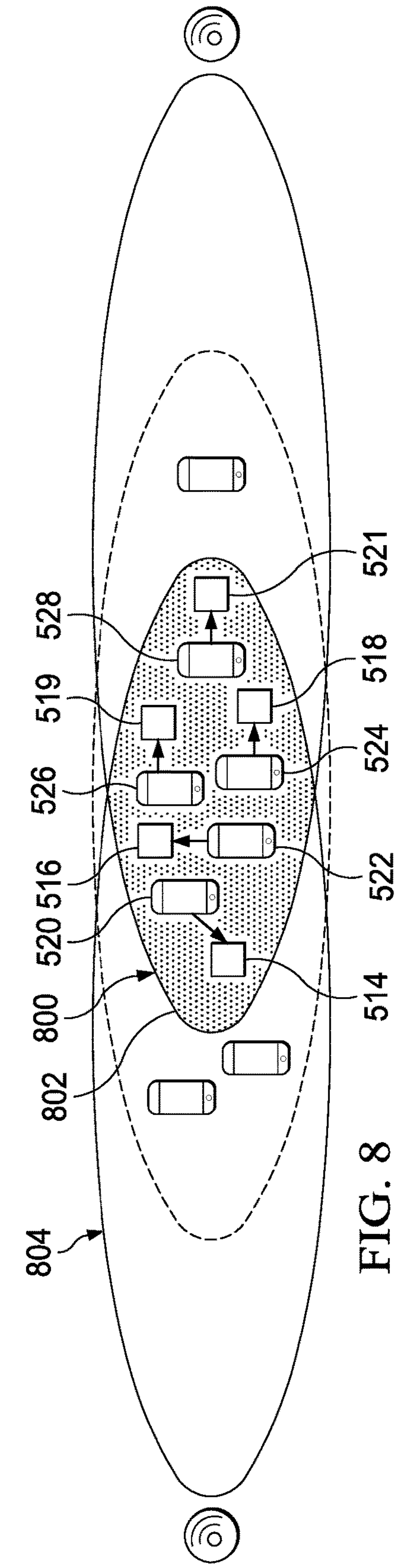
FIG. 8

BASEBAND AND METHOD FOR SELECTING A CO-ORDINATION SET OF NEIGHBORING BASEBANDS IN A CENTRALIZED RADIO ACCESS NETWORK (C-RAN)

RELATED APPLICATIONS

This application is a national stage application of International Patent Application No. PCT/IB2017/058123, filed Dec. 19, 2017, the disclosure of which is hereby incorporated herein by reference in its entirety.

TECHNICAL FIELD

The present disclosure relates in general to a centralized radio access network (C-RAN) and, in particular, to a baseband and method for dynamically selecting an "X" number of neighboring basebands to be assigned to a co-ordination set of the baseband based at least in part on measurement reports received from UEs.

BACKGROUND

The following abbreviations and terms are herewith defined, at least some of which are referred to within the following description of the present disclosure.

AWS Advanced Wireless Services
BB Baseband
CA Carrier Aggregation
CC Component Carrier
CoMP Coordinated Multi-Point
DL Down Link
eNodeB evolved Node B (LTE base station)
ESCell External Secondary Cell
ERAN Elastic RAN
LTE Long Term Evolution
MO Managed Object
MR Measurement Report
PCS Personal Communications System
QCI Quality Control Index
RAN Radio Access Network
RF Radio Frequency
ROP Recording Output Period
RTT Round Trip Time
RSRP Reference Signal Received Power
RSRQ Reference Signal Received Quality
Scell Secondary Cell
SINR Signal to Noise and Interference Ratio
UE User Equipment Elastic RAN: Elastic RAN is a term that Ericsson is currently using in the market place. Elastic RAN refers to a concept of removing L2/L3 processing from a radio node and connecting the L2/L3 processing nodes amongst themselves. Some people in the field refer to this as C-RAN and other terms may be used as well. The term "Elastic" in this concept means that various signal processing entities (i.e., basebands) can connect to each other, at the same or even remote locations, to allow for enhanced coordination. This essentially means that individual radio nodes, under control of a certain signal processing unit (baseband), can now be coordinated and aggregated using this connection mesh between the signal processing units. C-RAN is not "elastic" if connectivity between these signal processing units does not exist.

Carrier Aggregation: Carrier Aggregation is a LTE Rel.-10 defined feature that allows more than just a single carrier/cell to serve a UE at the same time. Up to 5 carrier cells can be configured to serve a UE at the same time. This allows increasing a peak throughput to the UE up to five times assuming all aggregated carriers have the same bandwidth.

Co-Ordination Set: Co-Ordination set consists of a source baseband and its predetermined number of neighboring (target) basebands across which CA can be accomplished.

CoMP: Coordinated Multi-Point (transmission/reception)

UL CoMP: Uplink (UL) CoMP is a LTE Rel.-10 defined feature that allows multiple cells (and not just the one cell that the UE is connected to) to combine a signal received from the UE and hence improve the uplink diversity gain leading to an increased uplink throughput in areas of overlap between the cells.

DL CoMP: Downlink (DL) CoMP is a LTE Rel.-10 defined feature that allows multiple cells to coordinate their transmissions to the UE and hence improve the downlink signal gain, leading to an increased downlink throughput in areas of overlap between cells.

Baseband: Baseband is a digital signal processing and control unit of an eNodeB (Note: A typical wireless telecom station has a baseband processing unit and a RF processing unit (radio node)).

Source Baseband: Source Baseband is the serving baseband unit that performs control and signal processing functions for the radio node that is delivering user data to a particular User Equipment (UE) connected to that radio node.

Neighboring Baseband: Neighboring Baseband is the baseband that performs control and signal processing functions for radio nodes that are neighbors to the serving radio node.

Inter-Frequency Measurement: Inter-Frequency Measurement is a UE-performed signal strength (RSRP) or signal quality (RSRQ) measurement, of a neighbor-cells that are on a different frequency than the serving cell.

Intra-Frequency Measurement: Intra-Frequency Measurements is a UE-performed signal strength (RSRP) or signal quality (RSRQ) measurement, of a neighbor-cells that are on the same frequency as the serving cell.

SCell: SCell is a secondary cell (i.e., another cell) that is on the same baseband as that of the primary cell.

ESCell: ESCell is an external cell that is on a different baseband than the baseband of the primary cell.

Round-Trip Time (RTT): RTT is the length of time it takes for a signal to be sent plus the length of time it takes for an acknowledgment of that signal to be received between two nodes in the network.

Referring to FIG. 1 (PRIOR ART), there is illustrated an exemplary distributed RAN (D-RAN) architecture 100 that is utilized by most current telecommunication networks. The D-RAN architecture includes multiple basebands $\mathbf{100}_1$, $\mathbf{100}_2$, $\mathbf{100}_3$ . . . $\mathbf{100}_n$ that are physically present at specific site locations. Each baseband $\mathbf{100}_1$, $\mathbf{100}_2$, $\mathbf{100}_3$ . . . $\mathbf{100}_n$ includes multiple radios 102, antenna systems 104, and cells 106 (note: only three radios 102, antenna systems 104 and cells 106 have been shown for each baseband $\mathbf{100}_1$, $\mathbf{100}_2$, $\mathbf{100}_3$ . . . $\mathbf{100}_n$). Because of the geographic separation between the basebands $\mathbf{100}_1$, $\mathbf{100}_2$, $\mathbf{100}_3$ . . . $\mathbf{100}_n$, there is a large round-trip time (RTT) between them. This large RTT makes any sort of co-ordination (i.e., Carrier aggregation or CoMP) between the basebands $\mathbf{100}_1$, $\mathbf{100}_2$, $\mathbf{100}_3$ . . . $\mathbf{100}_n$ very hard to accomplish. To help address, this problem the telecommunication networks have been evolving to a centralized RAN (C-RAN) architecture.

Referring to FIG. 2 (PRIOR ART), there is illustrated an exemplary centralized RAN (C-RAN) architecture 200 that can be utilized by telecommunication networks. In the C-RAN architecture 200, the basebands $\mathbf{100}_1$, $\mathbf{100}_2$, $100_3$ . . . $100_n$ have been moved to a centralized location known as a hub 202, but the radios 102, antenna systems 104 and cells 106 for each baseband $100_1$, $100_2$, $100_3$ . . . $100_n$ remain at their respective site locations. Because the basebands $100_1$, $100_2$, $100_3$ . . . $100_n$ are now at one location in the hub 202, the round-trip time (RTT) between them is very small. This small RTT makes the co-ordination (i.e., Carrier aggregation or CoMP) between the basebands $100_1$, $100_2$, $100_3$ . . . $100_n$ more feasible.

In the C-RAN architecture 200, multiple basebands $100_1$, $100_2$, $100_3$ . . . $100_n$ can now be connected to each other via an L2 switch 302 (e.g., see FIG. 3). If this is done, then what is commonly known in the field as an Elastic RAN feature (or similar features) may be activated. The Elastic RAN feature (or similar features) allows a UE to use DL transmission resources from partially or fully overlapping cells 106 belonging to different basebands $100_1$, $100_2$, $100_3$ . . . $100_n$. More specifically, with the Elastic RAN feature (or similar features), it is possible for a Rel-10 or greater UE device to receive DL data from cells 106 that belong to different basebands $100_1$, $100_2$, $100_3$ . . . $100_n$. The primary baseband $100_1$ (for example) that has the primary cell 106 (serving cell 106) forwards user-data to the external baseband $100_2$ (this forwarding can be done via a L2 switch or through a direct connect to the external baseband $100_2$) that has the secondary cell 106 (e.g., Scell 106) where the secondary cell 106 (e.g., Scell 106) then delivers the DL data to the UE. This enables the use of carrier aggregation in scenarios where the carriers are not deployed on the same baseband $100_1$ and $100_2$. An example of this is discussed next with respect to FIG. 3 (PRIOR ART).

Referring to FIG. 3 (PRIOR ART), there is illustrated an exemplary C-RAN architecture 300 used to help explain how carrier aggregation can be enabled across different basebands $100_1$ and $100_2$ (for example). In this example, the basebands $100_1$, $100_2$, $100_3$ . . . $100_n$ along with a L2 switch 302 are hosted in a hub 306 at a central location. Further in this example, the baseband-1 $100_1$ has three cells 106: Cell-1, Cell-2 and Cell-3 each operating in a different band. Cell-1 is operating in the AWS Band, Cell-2 is operating in the PCS Band and Cell-3 is operating in the 700 Band (Note 1: AWS Band is a wireless telecommunications spectrum band used for mobile voice and data services, video, and messaging in 2.1 GHz spectrum) (Note 2: PCS Band is a wireless telecommunications spectrum band used for mobile voice and data services, video, and messaging in 1.9 GHz spectrum). Similarly, the baseband-2 $100_2$ has three cells 106: Cell-4, Cell-5 and Cell-6 each operating in a different band. Cell-4 is operating in the AWS Band, Cell-5 is operating in the PCS Band and Cell-6 is operating in the 700 Band.

Thus, when UE 304 is served by the Cell-6, then the Cell-6 is the primary cell 106 and the Baseband-2 $100_2$ is the primary baseband. Cell-5 and Cell-1 are then secondary cells 106. Cell-1 is an ESCell since it belongs to a different baseband (i.e., Baseband-1 $100_1$) than the primary cell (i.e., Cell-6) and Cell-5 is SCell since it belongs to the same baseband (i.e., Baseband-2 $100_2$) as the primary cell (i.e., Cell-6). Since Baseband-1 $100_1$ and Baseband-2 $100_2$ are connected to each other via the L2 switch 302, it is possible, using the Elastic RAN feature (or similar features), for the UE 304 to utilize Cell-5 and Cell-1 as secondary cells 106 in 3CC (3 Component Carrier) Carrier Aggregation where three cells (i.e., Cells 1, 2, and 6) are configured to serve the UE 304 at the same time.

There are some restrictions to using the Elastic RAN feature (or similar features) across basebands $100_1$, $100_2$, $100_3$ . . . $100_n$. For example, in the current Elastic RAN feature the following restrictions exist: (1) one baseband $100_1$ (for example) can have logical links to a finite number of neighboring basebands (e.g. maximum of six neighboring basebands $100_2$, $100_4$, $100_5$, $100_6$, $100_7$ and $100_{21}$), and (2) the round trip time (RTT) to each of these six neighboring basebands $100_2$, $100_4$, $100_5$, $100_6$, $100_7$ and $100_{21}$ (for example) from the primary baseband $100_1$ (for example) must be within "X" μs (e.g., 60 microseconds). An example of this is discussed next with respect to FIG. 4 (PRIOR ART).

Referring to FIG. 4 (PRIOR ART), there is illustrated an exemplary C-RAN architecture 400 used to explain the aforementioned restrictions associated with the current Elastic RAN feature. In this example, each illustrated hexagon represents all of the radios 102, antenna systems 104, and cells 106 configured for one baseband $100_1$, $100_2$, $100_3$ . . . $100_{50}$ (e.g., 50 hexagons have been shown—but it should be appreciated there can be any number of hexagons). Further, baseband $100_1$ represents the primary baseband and the adjacent sites represent the six neighboring basebands $100_2$, $100_4$, $100_5$, $100_6$, $100_7$ and $100_{21}$ (note: the indicators [1], [2], [4], [5], [6], [7] and [21] are used to respectively indicate radios 102/antenna systems 104/cells 106 of basebands $100_1$, $100_2$, $100_4$, $100_5$, $100_6$, $100_7$ and $100_{21}$). There is a possibility that UEs 402, 404, 406 (for example) served by cells 106 of the primary baseband $100_1$ could benefit by using the carrier aggregation feature, where the secondary cells 106 are on one or more of the neighboring baseband $100_2$, $100_4$, $100_5$, $100_6$, $100_7$ and $100_{21}$.

The hub 408 accommodates many basebands $100_1$, $100_2$, $100_3$ . . . $100_{50}$ (for example) all of which are connected to a L2 switch 410 (e.g., Ethernet switch 410). Therefore, a physical connection can exist between each of the basebands $100_1$, $100_2$, $100_3$ . . . $100_n$ in the hub 408 via the L2 switch 410. And, since the basebands $100_1$, $100_2$, $100_3$ . . . $100_n$ are all physically located together at the hub 408 the latency (round trip time) requirement is met. However, a logical link can only be established by the L2 switch 410 between a primary baseband $100_1$ (for example) and six neighboring basebands $100_2$, $100_4$, $100_5$, $100_6$, $100_7$ and $100_{21}$ (for example). Today, the six neighboring basebands $100_2$, $100_4$, $100_5$, $100_6$, $100_7$ and $100_{21}$ (for example) that are defined for a single baseband $100_1$ (for example) are done so statically and manually. Further, each of the basebands $100_1$, $100_2$, $100_3$ . . . $100_n$ in the hub 408 will be a primary baseband in its own regard and will need to have its six neighboring basebands defined manually. This manual selection process is a tedious and time-consuming activity that will have to be repeated any time there is a new site addition to the telecommunications network and/or if there any RF changes to the environment. This problem and other problems are addressed herein by the present disclosure.

SUMMARY

A source baseband, a method, and a hub for addressing the aforementioned problems associated with the state-of-the art are described in the independent claims. Advantageous embodiments of the source baseband, the method, and the hub are further described in the dependent claims.

In one aspect, the present disclosure provides a source baseband in a centralized radio access network (C-RAN). In one embodiment, the source baseband comprises a processor and a memory that stores processor-executable instructions, wherein the processor interfaces with the memory to execute the processor-executable instructions, whereby the source baseband is operable to perform a dynamically select operation. In the dynamically select operation, the source baseband is operable to dynamically select a predetermined number of neighboring basebands to be part of a co-ordination set as follows: (1) determine which of the neighboring basebands meet a round trip time (RTT) condition, where the RTT condition is met for one of the neighboring basebands when signaling between the source baseband and the one of the neighboring basebands is less than a predetermined time; and (2) based on a determination that there are more than the predetermined number of neighboring basebands which satisfy the RTT condition, select the predetermined number of neighboring basebands based on measurement reports received from a plurality of user equipments (UEs) while taking into account at least one of a carrier aggregation (CA) utilization and a coordinated multi-point (CoMP) utilization. An exemplary advantage of the source baseband implementing the dynamically select operation is that the source baseband's co-ordination set of neighboring basebands can be automatically selected and updated (e.g., due to changing traffic patterns) based on actual measurement reports received from UEs while also taking into account CA utilization, CoMP utilization or a combination thereof.

In another aspect, the present disclosure provides a method implemented in a source baseband located in a centralized radio access network (C-RAN). In one embodiment, the method comprises a dynamically selecting step. In the dynamically selecting step, the source baseband dynamically selects a predetermined number of neighboring basebands to be part of a co-ordination set as follows: (1) determine which of the neighboring basebands meet a round trip time (RTT) condition, where the RTT condition is met for one of the neighboring basebands when signaling between the source baseband and the one of the neighboring basebands is less than a predetermined time; and (2) based on a determination that there are more than the predetermined number of neighboring basebands which satisfy the RTT condition, select the predetermined number of neighboring basebands based on measurement reports received from a plurality of user equipments (UEs) while taking into account at least one of a carrier aggregation (CA) utilization and a coordinated multi-point (CoMP) utilization. An exemplary advantage of the method including the dynamically selecting step is that the source baseband's co-ordination set of neighboring basebands can be automatically selected and updated (e.g., due to changing traffic patterns) based on actual measurement reports received from UEs while also taking into account CA utilization, CoMP utilization or a combination thereof.

In yet another aspect, the present disclosure provides a hub in a centralized radio access network (C-RAN). In one embodiment, the hub comprises a switch, and a plurality of basebands, wherein each one of the basebands is connected to the switch, wherein each one of the basebands is considered a source baseband while the remaining basebands are considered neighboring basebands, and wherein each one of the source basebands is configured to dynamically select a predetermined number of neighboring basebands to be part of a co-ordination set as follows: (1) determine which of the neighboring basebands meet a round trip time (RTT) condition, where the RTT condition is met for one of the neighboring basebands when signaling between the source baseband and the one of the neighboring basebands is less than a predetermined time; and (2) based on a determination that there are more than the predetermined number of neighboring basebands which satisfy the RTT condition, select the predetermined number of neighboring basebands based on measurement reports received from a plurality of user equipments (UEs) while taking into account at least one of a carrier aggregation (CA) utilization and a coordinated multi-point (CoMP) utilization. An exemplary advantage of the hub configured and operating in this manner is that the source baseband's co-ordination set of neighboring basebands can be automatically selected and updated (e.g., due to changing traffic patterns) based on actual measurement reports received from UEs while also taking into account CA utilization, CoMP utilization or a combination thereof.

Additional aspects of the present disclosure will be set forth, in part, in the detailed description, figures and any claims which follow, and in part will be derived from the detailed description, or can be learned by practice of the disclosure. It is to be understood that both the foregoing general description and the following detailed description are exemplary and explanatory only and are not restrictive of the present disclosure.

BRIEF DESCRIPTION OF THE DRAWINGS

A more complete understanding of the present disclosure may be obtained by reference to the following detailed description when taken in conjunction with the accompanying drawings:

FIGS. 6A, 6B, 6C, 6D1, 6D2, 6D3, and 6D4 are illustrations of exemplary neighbor relation tables used to describe an exemplary step-by-step process on how the source baseband could dynamically select the "X" number of neighboring basebands to be part of its co-ordination set in accordance with an embodiment of the present disclosure;

FIGS. 7A and 7B are illustrations of exemplary neighbor relation tables used to describe how a measurement report intensity column in a neighbor relation table can be weighted for intra-frequency measurement reports and inter-frequency measurement reports in accordance with an embodiment of the present disclosure;

FIG. 8 is an illustration of overlapping between cells used to describe how a "usable" overlap of the cells can be identified in accordance with an embodiment of the present disclosure;

DETAILED DESCRIPTION

Figure 5:
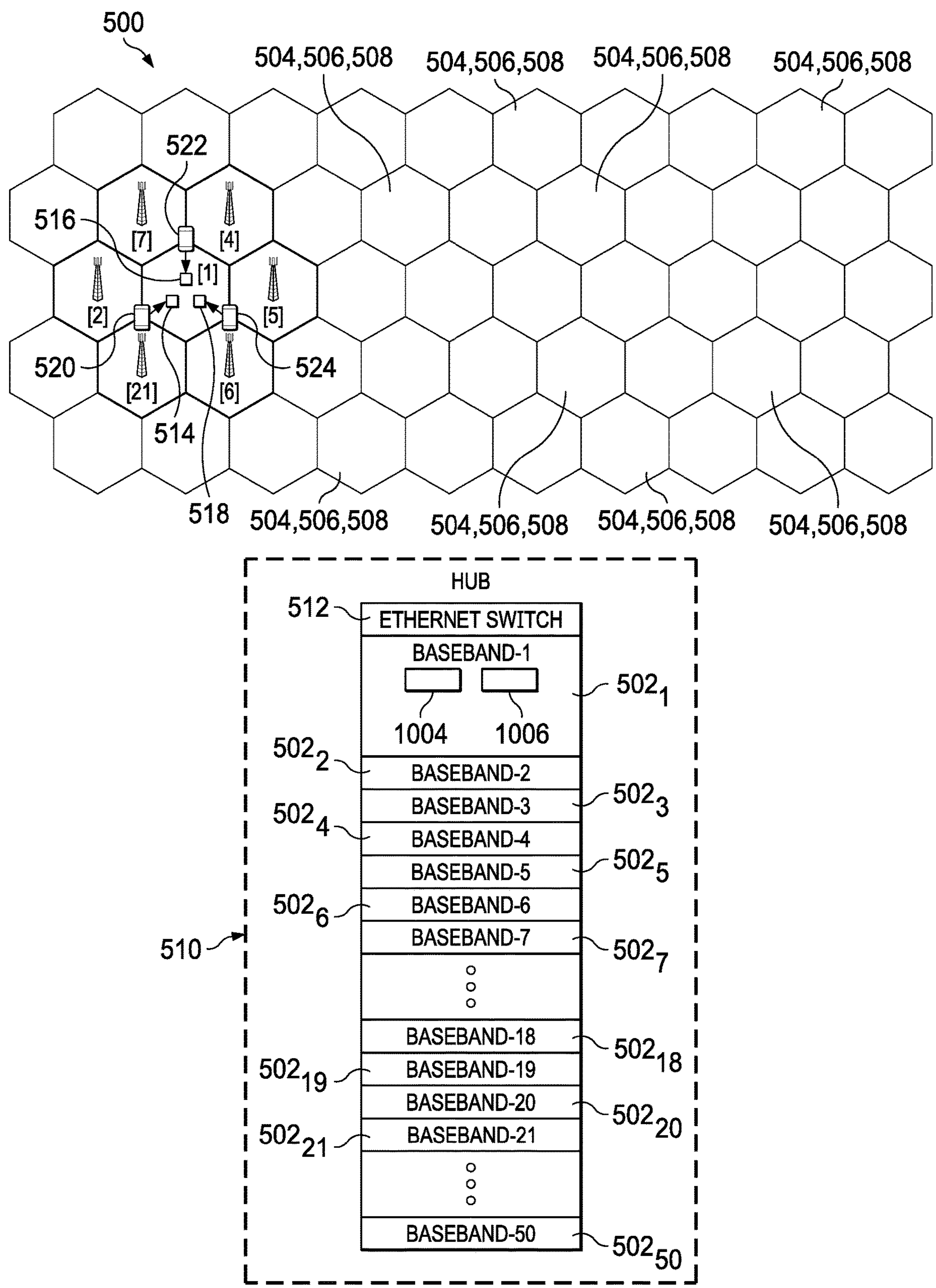
FIG. 5 is an illustration of an exemplary C-RAN architecture used to explain the basic features of a source baseband which is configured to dynamically select an "X" number of neighboring basebands to be part of its co-ordination set in accordance with an embodiment of the present disclosure.

Referring to FIG. 5, there is illustrated an exemplary C-RAN architecture 500 used to explain the basic features of a source baseband $\mathbf{502}_1$ (baseband-1 $\mathbf{502}_1$) which is configured to dynamically select an "X" number (e.g., six) of neighboring basebands $\mathbf{502}_2$, $\mathbf{502}_3$, $\mathbf{502}_4$, $\mathbf{502}_5$, $\mathbf{502}_6$ . . . $\mathbf{502}_n$ in accordance with an embodiment of the present disclosure. A hub 510 accommodates the basebands $\mathbf{502}_1$, $\mathbf{502}_2$, $\mathbf{502}_3$ . . . $\mathbf{502}_n$ all of which are connected to a L2 switch 512 (e.g., Ethernet switch 512). Therefore, a physical connection can exist between each of the basebands $\mathbf{502}_1$, $\mathbf{502}_2$, $\mathbf{502}_3$ . . . $\mathbf{502}_n$ in the hub 510 via the L2 switch 512. In this example, each illustrated hexagon represents all of the radios 504, antenna systems 506, and cells 508 configured for one baseband $\mathbf{502}_1$, $\mathbf{502}_2$, $\mathbf{502}_3$ . . . $\mathbf{502}_n$ (e.g., 50 hexagons have been shown there can be more or less). Note: although the hexagon "1" which is associated with baseband $\mathbf{502}_1$ is shown as having six adjacent hexagons "2", "4", "5", "6", "7", and "21" which are associated with six neighboring basebands $\mathbf{502}_2$, $\mathbf{502}_4$, $\mathbf{502}_5$, $\mathbf{502}_6$, $\mathbf{502}_7$ and $\mathbf{502}_{21}$ (for example) it should be appreciated that the baseband $\mathbf{502}_1$ in practice can have any number of neighboring basebands $\mathbf{502}_2$, $\mathbf{502}_3$, $\mathbf{502}_4$, $\mathbf{502}_5$, $\mathbf{502}_6$ . . . $\mathbf{502}_n$ and it is a feature of the present disclosure to dynamically select a predetermined number (e.g., six) of these neighboring basebands $\mathbf{502}_2$, $\mathbf{502}_3$, $\mathbf{502}_4$, $\mathbf{502}_5$, $\mathbf{502}_6$ . . . $\mathbf{502}_n$ to be part of the co-ordination set associated with baseband $\mathbf{502}_1$.

The baseband $\mathbf{502}_1$ (baseband-1 $502_1$) is configured to dynamically select an "X" number (e.g., six) of neighboring basebands $\mathbf{502}_2$, $\mathbf{502}_3$, $\mathbf{502}_4$, $\mathbf{502}_5$, $\mathbf{502}_6$ . . . $\mathbf{502}_n$ to be part of an co-ordination set as follows: (1) determine which of the neighboring basebands $\mathbf{502}_2$, $\mathbf{502}_3$, $\mathbf{502}_4$, $\mathbf{502}_5$, $\mathbf{502}_6$ . . . $\mathbf{502}_n$ meet a round trip time (RTT) condition, where the RTT condition is met for a specific one of the neighboring basebands $\mathbf{502}_2$, $\mathbf{502}_3$, $\mathbf{502}_4$, $\mathbf{502}_5$, $\mathbf{502}_6$ . . . $\mathbf{502}_n$ when signaling between the baseband-1 $\mathbf{502}_1$ (source baseband $\mathbf{502}_1$) and the specific one of the neighboring basebands $\mathbf{502}_2$, $\mathbf{502}_3$, $\mathbf{502}_4$, $\mathbf{502}_5$, $\mathbf{502}_6$ . . . $\mathbf{502}_n$ is less than a predetermined round-trip time (e.g., 60 μseconds); and (2) based on a determination that there are more than the predetermined number (e.g., six) of neighboring basebands $\mathbf{502}_2$, $\mathbf{502}_3$, $\mathbf{502}_4$, $\mathbf{502}_5$, $\mathbf{502}_6$ . . . $\mathbf{502}_n$ which satisfy the RTT condition, select the predetermined number (e.g., six) of neighboring basebands $\mathbf{502}_2$, $\mathbf{502}_3$, $\mathbf{502}_4$, $\mathbf{502}_5$, $\mathbf{502}_6$ . . . $\mathbf{502}_n$ based on measurement reports 514, 516, and 518 (only three shown) received from UEs 520, 522, and 524 (only three shown) while taking into account at least one of a Carrier Aggregation (CA) utilization and Coordinated Multipoint (CoMP) utilization. An exemplary step-by-step process on how the source baseband $\mathbf{502}_1$ can dynamically select the "X" number (e.g., six) of neighboring basebands $\mathbf{502}_2$, $\mathbf{502}_3$, $\mathbf{502}_4$, $\mathbf{502}_5$, $\mathbf{502}_6$ . . . $\mathbf{502}_n$ to be part of the co-ordination set in accordance with an embodiment of the present disclosure is as follows:

Step 1. Obtain a neighbor relation table 600 for the source baseband $\mathbf{502}_1$ (see FIG. 6A). The neighbor relation table 600 would have rows of neighbor relations $\mathbf{602}_1$, $\mathbf{602}_2$, $\mathbf{602}_3$ . . . $\mathbf{602}_n$ and each neighbor relation row would include (i) a source baseband identifier 604; (ii) a source cell identifier 606; (iii) a neighbor baseband identifier 608; (iv) a neighbor cell/frequency identifier 610; (v) a RTT value 612; and (vi) a measurement report intensity 614 (note: the specific RTT values 612 and measurement report intensities 614 have not yet been determined so they are not shown). In this example, each row in the neighbor relations table 600 maps a certain source cell (identified by the source cell identifier 606) to a source baseband (identified by the source baseband identifier 604). Further, each row also contains one and only one neighbor cell (identified by the neighbor cell/frequency identifier 610) of the source cell and this neighbor cell is connected to a neighbor baseband (identified to by the neighbor baseband identifier 608). The neighbor cell/frequency identifier 610 in addition to indicating a neighbor cell also identifies the frequency of the neighbor cell with respect to the frequency of the source cell (note: that the frequency on which certain cell is deployed is known a priori and that every cell is deployed on one frequency; i.e. the cell is a radio entity defined by location and unique transmit frequency). The notation for the column of neighbor cell/frequency identifier 610 is introduced to identify whether the neighbor cells have the same frequency or a different frequency than the corresponding source cell. The terms "same" and "different" are describing if the frequency of a neighbor cell is the same or different from the frequency of the source cell. For example, the notation "Cell-2, same" in the first row means that Cell-2 is a neighbor of source cell-1 and that neighbor cell-2 is on the same frequency as source cell-1. Similarly, source Cell-2 has a neighbor Cell-8 which is on a different frequency than source Cell-2, as described by indication (Cell-8, different) in a different row.

Step 2. Filter out neighbor relations $\mathbf{602}_1$, $\mathbf{602}_2$, $\mathbf{602}_3$ . . . $\mathbf{602}_n$ that belong to the same baseband as the source cells (see FIG. 6B). That is, filter out any of the neighbor relations $\mathbf{602}_1$, $\mathbf{602}_2$, $\mathbf{602}_3$ . . . $\mathbf{602}_n$ in which the source baseband identifier 604 and the neighbor baseband identifier 608 are the same. This step is performed because determining the best co-ordination set for any given baseband is about finding other basebands with the most overlap between their respective cells and the cells of the source baseband. Therefore, neighbor cells that are on the same baseband as the source cell are irrelevant, for this process, and are removed per step 2 from the relation table 600. In the illustrated example, the neighbor relations $\mathbf{602}_1$, $\mathbf{602}_2$, $\mathbf{602}_{20}$, $\mathbf{602}_{21}$, $\mathbf{602}_{n-2}$ and $\mathbf{602}_{n-3}$ are filtered out because the source baseband identifier 604 and the neighbor baseband identifier 608 are the same namely "baseband-1" (note: neighbor relations $\mathbf{602}_1$, $\mathbf{602}_2$, $\mathbf{602}_{20}$, $\mathbf{602}_{21}$, $\mathbf{602}_{n-2}$ and $\mathbf{602}_{n-3}$ are the ones explicitly shown to have been filtered-out but it should be appreciated that there can be other neighbor relations $\mathbf{602}_x$ which are not shown for clarity that have also been filtered out per step 2).

Step 3. Filter out any of the remaining neighbor relations $\mathbf{602}_3$, $\mathbf{602}_4$, $\mathbf{602}_{22}$, $\mathbf{602}_{23}$, $\mathbf{602}_{n-1}$ and $\mathbf{602}_n$ (these are the ones explicitly shown but there can be other remaining neighbor relations 602's which are not shown for clarity) that do not meet the RTT condition (see FIG. 6C). For instance, step 3 can be performed as follows: (a) for the remaining neighbor relations $\mathbf{602}_3$, $\mathbf{602}_4$, $\mathbf{602}_{22}$, $\mathbf{602}_{23}$, $\mathbf{602}_{n-1}$ and $\mathbf{602}_n$ compute a RTT time between the source baseband-1 and each of the respective neighbor basebands-2, 3, 4, 5, 6, and 7 (note: one RTT value would be computed between the source baseband-1 and each of the respective neighbor basebands-2, 3, 4, 5, 6, and 7 per a recording output period (ROP)); and (b) for a neighbor relation $\mathbf{602}_3$, $\mathbf{602}_4$, $\mathbf{602}_{22}$, $\mathbf{602}_{23}$, $\mathbf{602}_{n-1}$ and $\mathbf{602}_n$ to meet the RTT requirement the following condition would have to be satisfied: the last "n" measurements (can be a user defined parameter) must be below a threshold value (can be a user defined parameter where in this example the threshold is 60 μs). In the relational table 600 shown in FIG. 6C, the neighbor relations $602_4$, and $602_{23}$ (there could be more but not explicitly shown) have been filtered out per step 3 due to their RTT values being greater than the threshold of 60 μs (micro-seconds).

Figure 1:
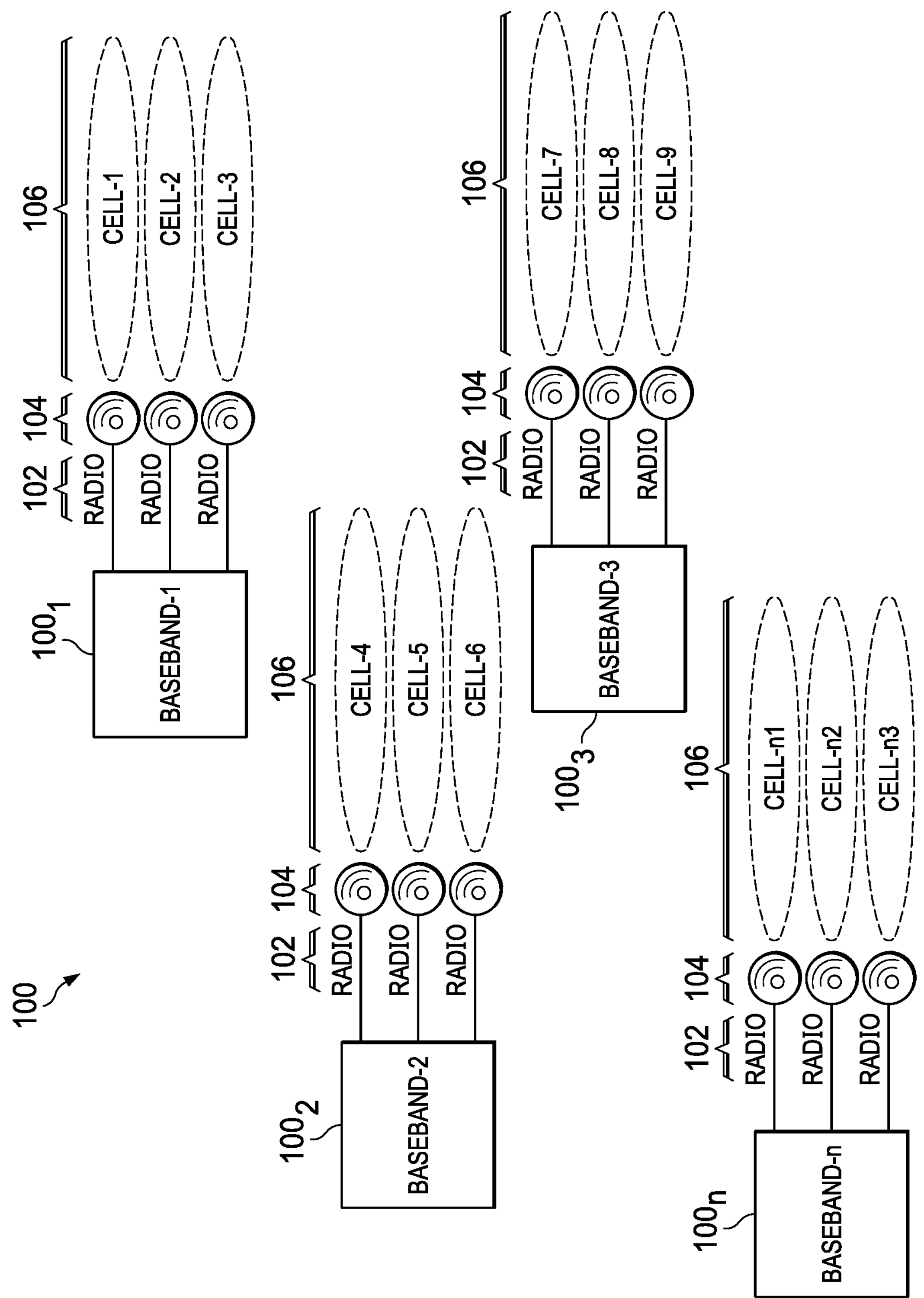
FIG. 1 (PRIOR ART) is an illustration of an exemplary distributed RAN (D-RAN) architecture that is utilized by most current telecommunication networks.

Step 4. Compute for the remaining neighbor relations $602_3$ $602_{22}$, $602_{n-1}$ and $602_n$ (these and five other neighbor relations are explicitly shown (see FIG. 6D1) but there can be other remaining neighbor relations 602's which are not shown for clarity) their respective measurement report intensities 614 based at least in part on the number of measurement reports 514, 516, and 518 (only three shown in FIG. 5) received from UEs 520, 522, and 524 (only three shown in FIG. 5) (see FIG. 6D1). A detailed discussion on an exemplary way to compute the measurement report intensities is discussed below after the discussion of step 6.

Figure 2:
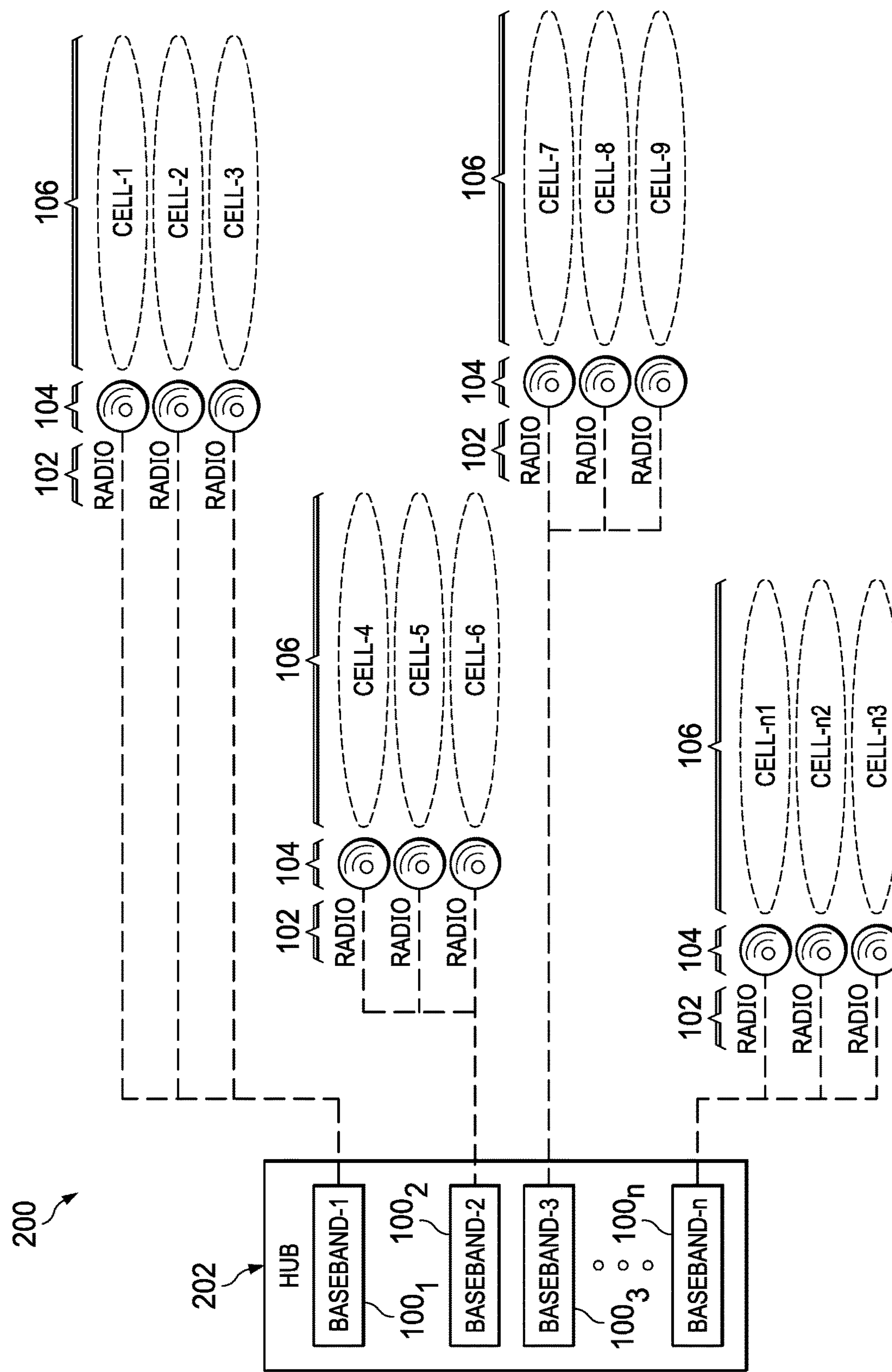
FIG. 2 (PRIOR ART) is an illustration of an exemplary centralized RAN (C-RAN) architecture that can be utilized by telecommunication networks.

Step 5. Sum the measurement report intensities 614 together for all the cells belonging to each one of the remaining neighbor basebands $602_3$ $602_{22}$, $602_{n-1}$ and $602_n$ (these and five other neighbor relations are explicitly shown but there can be other remaining neighbor relations $602_x$ which are not shown for clarity) (see FIGS. 6D1 and 6D2). In the relational table 600 shown in FIG. 6D1, each neighbor baseband-2, 4, 6, 7's specific cells have a corresponding measurement report intensity 614 (note: only neighbor basebands-2, 4, 6, 7 are shown but there can be other neighbor basebands). Then in the relational table 600 shown in FIG. 6D2, the neighbor baseband-2 has a summed measurement report intensity 614 of "903" (this includes the sum of all of the baseband-2's cells 5, 11, and 12), the neighbor baseband-4 has a summed measurement report intensity 614 of "547" (this includes the sum of all of the baseband-4's cells 7 and 9), neighbor baseband-6 has a summed measurement report intensity 614 of "76" (this includes baseband-6's cell 9), and neighbor baseband-7 has a summed measurement report intensity 614 of "396" (this includes the sum of all of the baseband-7's cells 10, 12 and 14). In FIG. 6D2, it is assumed that equal importance is given to the CA features (i.e., different frequency overlap) and CoMP features (i.e., same frequency overlap) so the number of received measurement reports 514, 516, 518 for CA and CoMP for any baseband relations pair have been added up without any weighting.

Figure 3:
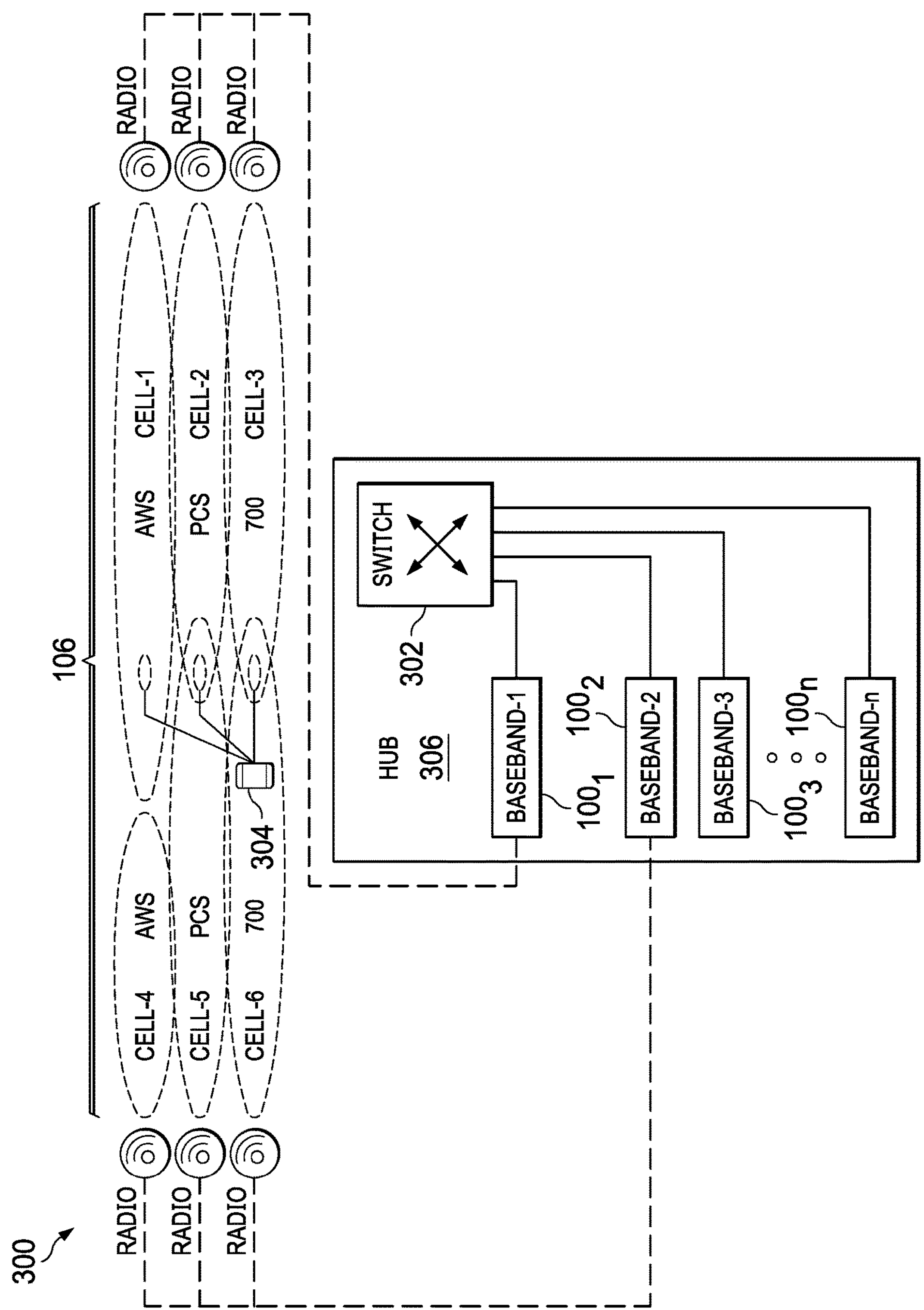
FIG. 3 (PRIOR ART) is an illustration of an exemplary C-RAN architecture used to help explain how carrier aggregation can be enabled across different basebands.
Figure 4:
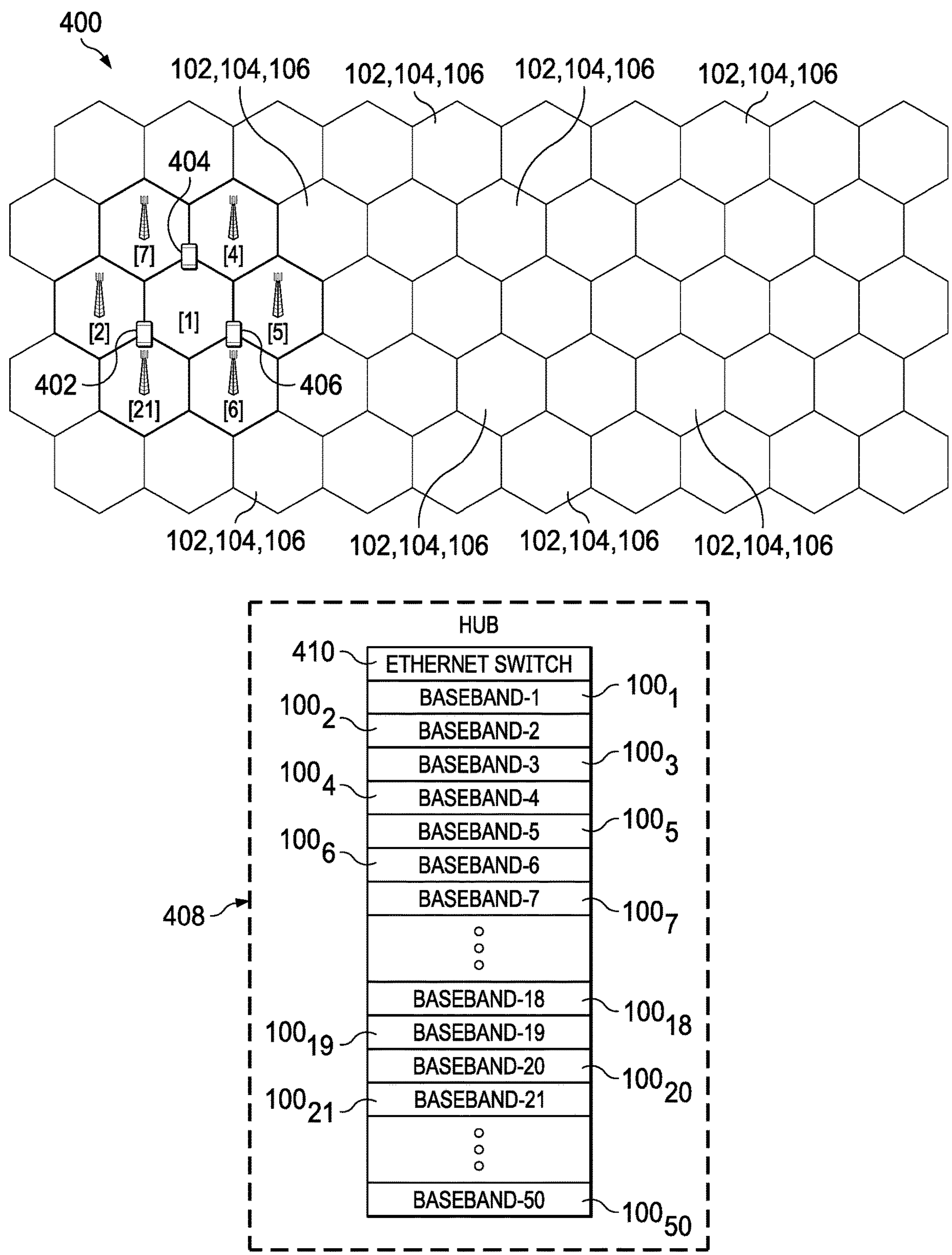
FIG. 4 (PRIOR ART) is an illustration of an exemplary C-RAN architecture used to explain restrictions associated with a current Elastic RAN feature.

Alternatively, should there be a desire to have different priorities with respect to CA and CoMP where there is a preference of CA over CoMP or vice versa, then the measurement reports 514, 516, 518 for each baseband relationship pair would be added separately for CA (associated with different frequency overlap indicated by inter-frequency measurement reports) and CoMP (associated with same frequency overlap indicated by intra-frequency measurement reports). An example of when CA and CoMP are given different priorities is shown as a two-step process in FIGS. 6D3 and 6D4. In FIG. 6D3, the relational table 600 has the summed measurement report intensity field 614 that is represented as the summed measurement report intensity (same, different) field 614 where the "same" identifies the number of intra-frequency measurement reports for CoMP and the "different" identifies the number of inter-frequency measurement reports for CA. In this particular example, the neighbor baseband-2 has a summed measurement report intensity 614 of "579, 324" (this includes the sum of all of the baseband-2's cells 5, 11, and 12 where "579" corresponds to CoMP and "324" corresponds to CA), the neighbor baseband-4 has a summed measurement report intensity 614 of "547, 0" (this includes the sum of all of the baseband-4's cells 7 and 13 where "547" corresponds to CoMP and "0" corresponds to CA), the neighbor baseband-6 has a summed measurement report intensity 614 of "76, 0" (this includes baseband-6's cell 9 where "76" corresponds to CoMP and "0" corresponds to CA), and neighbor baseband-7 has a summed measurement report intensity 614 of "195, 201" (this includes the sum of all of the baseband-7's cells 10, 12 and 14 where "195" corresponds to CoMP and "201" corresponds to CA). In the next step, assume that a user (operator) wants to give priority to CA (different frequency overlap) over CoMP (same frequency overlap) and expresses that priority as a 60% to 40% ratio. Thus, to arrive to the resulting measurement report intensity 614, the same frequency measurement reports (associated with CoMP) are multiplied by 40% and the different frequency measurement reports (associated with CA) are multiplied by 60%. FIG. 6D4, illustrates the resulting measurement report intensities 614 based on FIG. 6D3's data where (i) for the baseband-1, baseband-2 relationship the final measurement report intensity 614 (MI) is calculated as MI=579*0.4+324*0.6=426; (ii) for the baseband-1, baseband-4 relationship the final measurement report intensity 614 (MI) is calculated as MI=547*0.4+0*0.6=219; (iii) for the baseband-1, baseband-6 relationship the final measurement report intensity 614 (MI 614) is calculated as MI=76*0.4+0*0.6=30; and (iv) for the baseband-1, baseband-7 relationship the final measurement report intensity 614 (MI) is calculated as MI=195*0.4+201*0.6=199. This alternative process where there are different priorities with respect to CA and CoMP can be applied when there is an intent to maximize the benefit of both CA and CoMP features, where the measurement records for the CoMP co-ordination sets and the CA co-ordination set are kept independent and then factored in to a final result by applying adequate, user configured, weights. In this alternative process, two separate measurement reports 514, 516, 518 are configured for measuring the overlap, one measurement report is configured to measure the same frequency overlap (CoMP) and the other measurement report is configured to measure different frequency overlap (CA) (detailed examples of these two types of measurement reports 514, 516, 518 is provided below). In yet another alternative, this procedure can be reduced to single method where there is CoMP alone or CA alone. In this case, one of the measurement reports is not configured, utilized, or alternatively the multiplying weight is set to 0 for the unwanted overlap-quantity.

Step 6. Select the predetermined number of neighboring basebands which have highest sums of measurement report intensities 614 to be in the co-ordination set of the source baseband-1. For instance, step 6 can be performed by sorting the summed measurement report intensities 614 (see FIGS. 6D2 and 6D4) in descending order and then identifying the top "X" predetermined number (e.g., six) neighboring basebands. These selected "X" neighboring basebands will be in the co-ordination set of the source baseband-1. Note 1: It should be appreciated that each baseband $502_1$, $502_2$, $502_3$, $502_4$, $502_5$, $502_6$ . . . $502_n$ would perform steps 1 through 6 to come up with the list of their respective most optimal predetermined number of neighboring basebands to be part of their respective co-ordination set.

The following are some features associated with the present disclosure which were discussed above with respect to steps 1-6:

Each row in the neighbor relation table 600 defines one source cell-neighbor cell pair.

Each cell belongs (is homed to) to one and only one baseband.

Each cell is transmitting (operating) on one and only one frequency. Hence, the frequency of the neighbor cell in each row is known a priory.

Separate measurement reports 514, 516, 518 are configured for the same and different frequency neighbor cells in order to measure the same and different frequency overlap (note: this feature is discussed in more detail below with respect to FIG. 7).

Measurement report intensity 614 is the count of measurement reports 514, 516, 518 that UEs 520, 522, 524 send in response to measurement configurations that have been set as a proxy for determining the overlaps. This means that the measurement report intensity 614, that is incremented in a certain row of the table 600, is either in response to the same frequency measurement (intra-frequency measurement report) or different frequency measurement (inter-frequency measurement report) never both as the neighbor cell in the row is either the same frequency or a different frequency in relation to the source cell.

If the user (operator) wants to put more importance or weight to the same frequency counts vs. different frequency counts then measurement report intensity 614 becomes the count of measurement reports 514, 516, 518 multiplied by the weight i.e. MI_total=MI_same*w+MI_different*(1−w), where 1>=W<=0 and MI=measurement report intensity 614 (note: this feature is discussed in more detail below).

If the user (operator) wants the same frequency overlap to have the same importance as the different frequency overlap then weights are not needed and the measurement report intensity 614 is a straight sum i.e. MI_total=MI_same+MI_different where MI=measurement report intensity 614 (note: this feature is discussed in more detail below).

To compute the measurement report intensities 614 per step 4, the measurement reports 514, 516, and 518 (e.g., signal quality (such as RSRQ) measurement reports 514, 516, and 518) are setup to indicate the amount of interference between cells. That is, the UEs 520, 522, 524 measure the amount of interference between the cell(s) and then report this measurement in the measurement reports 514, 516, and 518 which are sent to the source baseband-1 $502_1$. Further, separate measurement reports 514, 516, and 518 can be setup for both inter-frequency measurements (for CA utilization) and intra-frequency measurements (for CoMP utilization), each with a different threshold. The reason for the differing thresholds for the measurement reports 514, 516, and 518 is to attain the maximum benefit for the CA and CoMP features. Some exemplary measurement reports 514, 516, 518 are discussed below as follows:

For CoMP, the neighbor cell should be within "Y" dB (can be a user defined parameter) of the source cell. Here, an intra-frequency A3 RSRQ measurement report may be used with offset+hysteresis thresholds set to the "Y" dB value (note 1: The LTE Event A3 is triggered when a neighboring cell becomes better than the serving cell by an offset. The offset can be either positive or negative. The LTE Event A3 is triggered when the following condition is true: $MEAS_{neigh}+O_{neigh,freq}+O_{neigh,cell}-Hyst>MEAS_{serv}+O_{serv,freq}+O_{serv,cell}+Offset$) (note 2: the intra-frequency A3 measurement is defined by 3GPP (ETSI) in specification TS 36.331 V14.4.0 (Sep. 26, 2017—the contents of which are hereby incorporated by reference herein).

For Carrier aggregation, an A5 RSRQ measurement report can be setup with a configurable A5threshold1 (i.e. the source cell RSRQ threshold) and configurable A5threshold2 value (i.e. the neighbors' RSRQ threshold) (note 1: LTE Event A5 is triggered when the serving cell becomes worse than threshold-1 while a neighboring cell becomes better than threshold-2. The event is triggered when both of the following conditions are true: (1) $MEAS_{serv}+Hyst<Threshold\text{-}1$ (condition for a source cell), and (2) $MEAS_{neigh}+O_{neigh,freq}+O_{neigh,cell}-Hyst>Threshold\text{-}2$ (condition for a different frequency neighbor cell) (note 2: the A5 RSRQ measurement report is also defined by 3GPP (ETSI) in specification TS 36.331 V14.4.0 (Sep. 26, 2017—the contents of which are hereby incorporated by reference herein).

The UEs 520, 522, 524 are configured to make specific measurements when certain conditions are met in the areas where the source cell and the neighbor cell are similar in signal level and then create measurement reports 514, 516, 518. This process is a proxy for overlap detection. The measurement report intensity 614 is a counter of the measurement reports 514, 516, 518 that the UEs 520, 522, 524 create and send when specific conditions have been meet. For example, if UE 520 is on cell-1, which is homed on baseband-1 will send a measurement report 514 indicating Cell-5, as a neighbor cell, for CoMP (see the first example measurement report above) when conditions defined in the measurement configurations are met. Then the measurement report intensity 614 for the corresponding neighbor relation (row) is incremented by "1*weight_for_same_frequency neighbor" in a matching row in the table (or 1*w) as shown in FIG. 7A. Then, some other UE 522 may send a measurement report 516 indicating cell-12, as a neighbor cell, for CA (see the second example measurement report above) when conditions defined in measurement configurations are met. Then the measurement report intensity 614 for the corresponding neighbor relation (row) will be incremented by "1*weight_for_different_frequency neighbor" in a matching row in the table or "1*(1−w)" as shown in FIG. 7B. Further, when the UE 520, 522, 524 requests to add a QCI bearer=1, the inter-frequency measurement reports 514, 516, 518 would de-configured to avoid inter-frequency measurements during voice calls. That is, the UE 520, 522, 524 that requests to add a QCI bearer=1 will not send any measurement reports 514, 516, 518 while they are on voice calls.

The above configured measurement reports 514, 516, 518 are restricted to quantity of "1" to prevent the same UE 520, 522, 524 from sending repetitive measurement reports 514, 516, 518. That is, when and if the conditions defined in measurement configuration are met then the UE 520, 522, 524 shall create and send a measurement report 514, 516, 518 once and only once during the time for which the measurement is configured, which is typically equal to a length of a connection of the UE 520, 522, 524 to the source cell (i.e., this also practically means that measurement is implicitly de-configured if the UE 520, 522, 524 sends one measurement report 514, 516, 518 in response to making the measurement). Note: The measurement reports 514, 516, 518 are explicitly configured, by the source baseband $502_1$, when UE 520, 522, 524 connects to a source cell. When the UE 520, 522, 524 disconnects from the source cell all configured measurements are voided by default (i.e., idle UEs do not have any measurements configured). In the case of handover, where the UE 520, 522, 524 connects to a new source cell, measurements are re-configured by the new source cell. Further, the percentage of UEs 520, 522, 524 that are set to actually send the measurement reports 514, 516, 518 can be configured to be in the range of 0% to 100%. This would be done to reduce the number of measurement reports 514, 516, 518 and hence load on the system. In the typical network setting this percentage can be set to as low as 10% (or even lower) which would still be enough UEs 520, 522, 524 to provide measurement reports 514, 516, 518 that will allow the process to converge in order to determine suitable co-ordination sets.

Another reason for restricting the configured measurement reports 516, 516, 518 to a quantity of "1" is to ascertain, not just the amount of "usable" overlap between the cells, but also the traffic in this "usable" overlap area. An example of this is shown in FIG. 8 where the shaded area 800 in between the cells 802 and 804 is the "usable" overlap since this is the area where the signal strength of the two cells 802 and 804 can be used to enable, for example, carrier aggregation. Each UE 520, 522, 524, 526, 528 (5 shown) in the shaded area 800 will send a respective measurement report 514, 516, 518, 519, 521 only once. The number of received measurement reports 514, 516, 518, 519, 521 will give an indication of the number of UEs 520, 522, 524, 526, 528 in the "usable" overlap area 800 (i.e. that is this will give an indication of the traffic in the "usable" overlap area 800).

As discussed above, it is desirable to determine the overlap on the same frequency as well as on the different co-located frequency or frequencies, separately because the overlap area 800 is where the signal strength of the two cells 802 and 804 can be used to enable, for example, carrier aggregation. Therefore, separate measurement reports 514, 516, 518, 519, 521 are configured by the baseband-1 $\mathbf{502}_1$ (for example) for the UEs 520, 522, 524, 526, 528. This configuration can be done to all UEs 520, 522, 524, 526, 528 when they connect to the network, or more likely this can be done to a certain percentage (e.g., 20%) of UEs 520, 522, 524, 526, 528 picked at random. In the first measurement configuration, the baseband-1 $\mathbf{502}_1$ (for example) specifies to UEs 520, 522, 524, 526, 528 to send a measurement report 514, 516, 518, 519, 521 if the RSRQ measurement, of the same-frequency-neighbor(s), is within the certain range relative to the serving cell (this range is defined in the measurement configuration). Then, these UEs 520, 522, 524, 526, 528 measure all same-frequency-neighbors (periodically) and, if the condition(s) specified in measurement configuration, is met then the UEs 520, 522, 524, 526, 528 will send the measurement report 514, 516, 518, 519, 521 detailing measurement specifics (e.g. RSRQ of serving cell and RSRQ of neighbor(s) satisfying condition from measurement configuration). In the second measurement configuration, the baseband-1 $\mathbf{502}_1$ (for example) specifies to UEs 520, 522, 524, 526, 528 to send a measurement report 514, 516, 518, 519, 521 if the RSRQ measurement of the source cell drops below the A5threshold1 and the RSRQ measurement of a different-frequency-neighbor(s) is greater than A5threshold2 (note: different here means different frequency from the frequency of a serving cell) (recall: the UE 520, 522, 524, 526, 528 sends the A5 measurement report 514, 516, 518, 519, 521 if two conditions are met: (1) the RSRQ of the source cell drops below A5threshold1; and (2) the RSRQ of the (different frequency) neighbor-cell drops below A5threshold2. The first condition is set to indicate cell edge for the source cell and the second condition is set to look for strong different frequency-neighbors overlaps). Again, in addition to measuring neighbor cell(s) on the serving frequency, the UEs 520, 522, 524, 526, 528 periodically measures neighbor cell(s) on a pre-specified frequency (different from a serving one) and reports back if and when RSRQ conditions, are met, for the different-frequency-neighbor cell(s). Both measurement configurations specify to the UEs 520, 522, 524, 526, 528 to report only once (i.e. once for each measurement configuration), if the pre-specified condition(s) are met (note: the same UEs 520, 522, 524, 526, 528 can be pre-configured for both the first measurement configuration and the second measurement configuration). Counting these measurements reports 514, 516, 518, 519, 521 for reported neighbor cell(s), for a certain source baseband $\mathbf{502}_1$ (for example), is what is indicated by the measurement report intensity 614. These counts give an idea of an overlap percentage, for a certain (source, neighbor) combination, as the measurement reports 514, 516, 518, 519, 521 are configured to indicate neighbor cell(s) that are close in signal strength to that of a serving cell (i.e. indication of the strong overlapping cell(s)).

When the measurement reports 514, 516, 518, 519, 521 are activated, the baseband-1 $\mathbf{502}_1$ (for example) will keep a count of the number of such measurement reports 514, 516, 518, 519, 521 received for the first ROP and update this count in the measurement report intensity 614 per neighbor relation for each of the cells on the baseband-1 $\mathbf{502}_1$ (note: each baseband $\mathbf{502}_1$, $\mathbf{502}_2$ . . . $\mathbf{502}_n$ performs this process (i.e., steps 1 through 6) to come up with the list of their respective most optimal neighboring basebands to be part of their respective co-ordination set). As discussed above, if desired a separate count can be kept for intra-frequency measurement reports 514, 516, 518, 519, 521 and inter-frequency measurement reports 514, 516, 518, 519, 521, where the intra-frequency measurement report intensity 614 is used to optimize CoMP targets and the inter-frequency measurement report intensity 614 is used to optimize Carrier Aggregation targets. After the first ROP, for each subsequent ROP the measurement report intensity 614 can be "filtered" where the term "filtered" means that the current ROP measurement report intensity 614 value is weighted with a count value obtained from the current ROP but also a count value from the previous ROP. For example, the "filtering" can be accomplished using the 3GPP Layer 3 filtering technique which is as follows:

$$F_n=(1-a)\cdot F_{n-1}+a\cdot M_n \quad (1)$$

where $M_n$ is the latest ROP count of the Measurement Reports received $F_n$ is the updated filtered measurement result (for the current ROP)

$F_{n-1}$ is the old filtered measurement result (from the last ROP). $F_o$, is set to $M_1$.

$a=\frac{1}{2}^{(k/4)}$, where k is a filter coefficient that can be a user defined parameter.

This "filtering" scheme can be used if desired to prevent relative large reactions if there are temporary spikes in measurement report counts, which may lead to frequent re-configurations of the co-ordination sets. That is, the "filtering" is used to smooth (average) the measurement report counts over multiple ROPs.

The evaluation of the top "X" neighboring basebands for the co-ordination set and the (re)configuration of the co-ordination set can be performed every N×ROPs, where N>1 (can be a user defined parameter). For example, if the ROP is 15 minutes then the evaluation of the top "X" neighboring basebands for the co-ordination set and the possible (re) configuration action may occur every 4 ROPs (i.e. every hour). After each evaluation period, the measurement report intensities 614 calculation are reset to zero.

Further, the evaluation of the top "X" neighboring basebands for the co-ordination set can run continuously in time, as described above, or be triggered by certain events, and then continue running for a discrete period of time only. In the case of the event triggered operation, the measurements are being configured to the UEs 520, 522, 524, 526, 528, for a period of time only in case of the occurrence of certain events. Note: that when Measurement Intensity 614 stops incrementing (i.e. when measurements are stopped being configured to the UEs 520, 522, 524, 526, 528) this effectively means that there will be no changes to the co-ordination sets (i.e., the starting/stopping of the measurement configurations to the UEs 520, 524, 526, 528 can be used as an implicit way to start/stop co-ordination set determination). This mechanism may then be used to reduce processing on the baseband $\mathbf{502}_1$, by configuring measurements initially for a finite period of time, to obtain initial co-ordination set, and then re-start again only in case of certain events. As an example, if desired, the measurement reports 514, 516, 518, 519, 521 can be configured for a "n" days evaluation period (this period can be an operator defined parameter) in which the measurement reports 514, 516, 518, 519, 521 can be used in the computing of the measurement report intensity 614. During this "n" day evaluation period, every "N" ROP's will be considered as an "sub-evaluation period" after which, the co-ordination set is updated, as described in FIGS. 6A, 6B, 6C, 6D1, 6D2, 6D3 and 6D4. The measurement report intensities 614 calculation are reset to zero, only after the full "n" days evaluation period and not after the "N" ROP "sub-evaluation period". After "n" days evaluation period, measurement reports 514, 516, 518, 519, 521 stop being configured, effectively locking the co-ordination set in place. Measurements reports 514, 516, 518, 519, 521 will then start to be configured to the UEs 520, 522, 524, 526, 528 again (for a period of "n" days) only if at least one of the below events occur:

1. A change in the neighbor list, i.e. if any neighbor baseband is added to which more than "n" handovers (can be a user defined parameter) occur in a ROP.

2. Change in the intensity of handovers occurring, i.e. if the total number of handovers occurring per source baseband changes by more than "n1" standard deviations (can be a user defined parameter). The moving standard deviation for a window of the last "x" days (e.g., 7 days) of the total number of handovers occurring per day for a given source baseband would be maintained in order to determine this trigger (e.g., for every subsequent day a new standard deviation is computed (for the last "7" days). If the new standard deviation calculated differs from the old standard deviation by more than "2" times the old standard deviation, then the condition is met and measurement reporting would be reconfigured for the UEs). For example, assuming the following were the total number of handovers occurring for a given source baseband for the last "7" days—{903, 998, 964, 974, 963, 940, 936}. Then, the standard deviation for this data set is 30.65. Now if on Day 8 the number of handovers is "700". The new data is now—{998, 964, 974, 963, 940, 936, 700}. The new standard deviation is 101.37. This is more than "2" standard deviations from the old standard deviation of 30.65 (i.e. 101.37>2*30.65). Therefore, the condition is met and the measurement reporting is reconfigured.

3. Change in the RTT time between basebands $\mathbf{502}_1$, $\mathbf{502}_2$ . . . $\mathbf{502}_n$ that causes one or more of these basebands $\mathbf{502}_1$, $\mathbf{502}_2$ . . . $\mathbf{502}_n$ to "fall out" of the co-ordination set. For example, assume that the basebands $\mathbf{502}_1$, $\mathbf{502}_2$ . . . $\mathbf{502}_n$ are all belong to the co-ordination set of source baseband 502$x$. The RTT time between basebands $\mathbf{502}_1$, $\mathbf{502}_2$ . . . $\mathbf{502}_n$ is to remain less than 60 μs (microseconds). In every ROP assume the source baseband 502$x$ makes "x" RTT measurements. If a certain percentage of the "x" RTT measurements (can be operator defined) in the ROP are greater than 60 μs or if even a single RTT measurement in a ROP is above the 60 μs limit, then the measurement reports 514, 516, 518, 519, 521 would be configured again to the UEs 520, 522, 524, 526, 528. That is, the choice of using a "certain percentage" or "even a single" RTT measurement above the 60 microsecond threshold is dependent on how strictly the operator wants to adhere to the 60 microsecond limit.

In case there are separate counts in the measurement report intensity 614 (same/different) being maintained for CoMP (i.e. an intra frequency neighbors count) and Carrier Aggregation (i.e. an inter frequency neighbors count), then a user defined parameter can be used to choose which feature should be prioritized and the respective count should be used for deciding the neighboring baseband co-ordination set. In effect, the counts of the intra-frequency measurement reports 514, 516, 518, 519, 521 and the inter-frequency measurement reports 514, 516, 518, 519, 521 are allowed to be separate so as to allow the user (operator) to define if and how the CA and CoMP measurement report intensities 614 are to be combined in case one is to be preferred over the other. This process allows greater optimization flexibility in operation when scaling between CA and CoMP features. Conceptually, one can think of the measurement report intensity 614 as one value aggregating both intra-frequency measurement reports 514, 516, 518, 519, 521 and inter-frequency measurement reports 514, 516, 518, 519, 521 but with option of weighting each of their respective counts with user defined weights (parameters) to prioritize one measurement count over the other, if so desired. One implementation, of this, could be to have weights for each type of measurement count defined by 1 parameter (weight "w") in range [0 . . . 1] and aggregate the intra-frequency measurement report count (CoMP) and the inter-frequency measurement report count (CA) as: (Measurement count CoMP*w+Measurement count CA*(1−w)). That is, these separate counts can be modeled (prioritized) by a weight parameter ("w"; range [0 . . . 1]) where the same frequency neighbor measurement reports 514, 516, 518, 519, 521 (associated with CoMP) are multiplied with "w" and the different frequency neighbor measurement reports 514, 516, 518, 519, 521 (associated with CA) are multiplied by "(1−w)". This exemplary feature has also discussed in detail above with respect to step 5 and is further described in more detail next.

Referring back to step 5, it should be appreciated that a particular neighbor (i.e. row in the neighbor relation table 600), will be either the same frequency neighbor or a different frequency neighbor in relation to the active cell; never both. Every row in the neighbor relation table 600 is defined with the source (i.e. serving cell) and a particular neighbor cell (that is either same or different frequency and belongs to either the same or different baseband). This information is known a priori. Every time a measurement report 514, 516, 518, 519, 521 is received for an intra-frequency neighbor cell, the measurement report intensity 614 count for the applicable row is incremented by one (and possibly multiplied by the intra-frequency-weight). Likewise, every time a measurement report 514, 516, 518, 519, 521 is received for an inter-frequency neighbor, the measurement report intensity 614 count for the applicable row is incremented by one (and possibly multiplied by (1−w)). It should be appreciated that a particular neighbor cell, in the neighbor relation table 600, can be either an inter-frequency neighbor cell or an intra-frequency neighbor cell, but never both for the same source cell (i.e. serving cell). For example, assume there is cell_1A on frequency A, and its neighbors cell_2A and cell_3B are on frequency A and frequency B, respectively (note: "A" and "B" in this example are indicators of a radio frequency for a given cell). Further, assume that cells 1A and 3B are on the same, baseband (BB1) which is a different baseband from the baseband (BB2) for cell_2A. Further, assume there is a third baseband (BB3), as well, that hosts cell_4B and cell_5A. So there is the following:

BB1: cell_1A, cell_3B

BB2: cell_2A

BB3: cell_4B, cell_5A

Assume that some UE1 is on cell_1A and sends a measurement report-1 with neighbor cell_2A. In this case, the BB1 looks for neighbor cell_2A in the neighbor list of cell_1A, finds out that this neighbor cell is on a different baseband (i.e., on BB2) and that the RTT is less than the limit and then proceeds to increment the corresponding measurement report intensity 614 by (one*w), for that row. Then, some other UE2 that is on cell_3B also sends a measurement report-2 for neighbor cell_2A. Again, the BB1 finds a row where cell_2A is a neighbor of cell_3B, sees that cell_2A is on a different baseband (i.e., on BB2) and that RTT is less than the limit and proceeds to increment the measurement report intensity 614 in that row by 1*(1−w), because this is inter-frequency relationship. The total tally for BB1 in relation to BB2 (after these two MRs) is "1*w+1*(1−w)".

Assume UE3 while on cell_3B, sends measurement report-3 with neighbor cell_4B and another UE4 while on cell_1A, sends a measurement report-4 with neighbor cell_1A. For UE 3's measurement report-3, the BB1 increments the measurement report intensity 614 by (1*w) in the row where cell_3B is the source and cell_4B a neighbor. For UE4's measurement report-4, the BB1 increments the measurement report intensity 614 by (1*w) in the row where cell_1A is a source and cell_5A a neighbor. Hence after measurements #3 and #4 the total tally for BB1 in relation to BB3 is "1*w+1*w".

Now, the implementation of this principle could be to have separate measurement report intensities 614 for intra-frequency neighbors and inter-frequency neighbors, as well. This is possible because a particular row in the table 600 can be one or the other but never both. That is, each row has either the same frequency neighbor or a different frequency neighbor and the measurement report intensity 614 that increments there is either in response to a CoMP intra-frequency measurement report or a CA inter-frequency report, never both. The idea is that there can be, but does not absolutely have to be, separate the measurement report intensities 614 for same (CoMP) and different (CA) frequency neighbors to arrive to the intended result while taking into account CA, CoMP utilization or a combination thereof.

Figure 9:
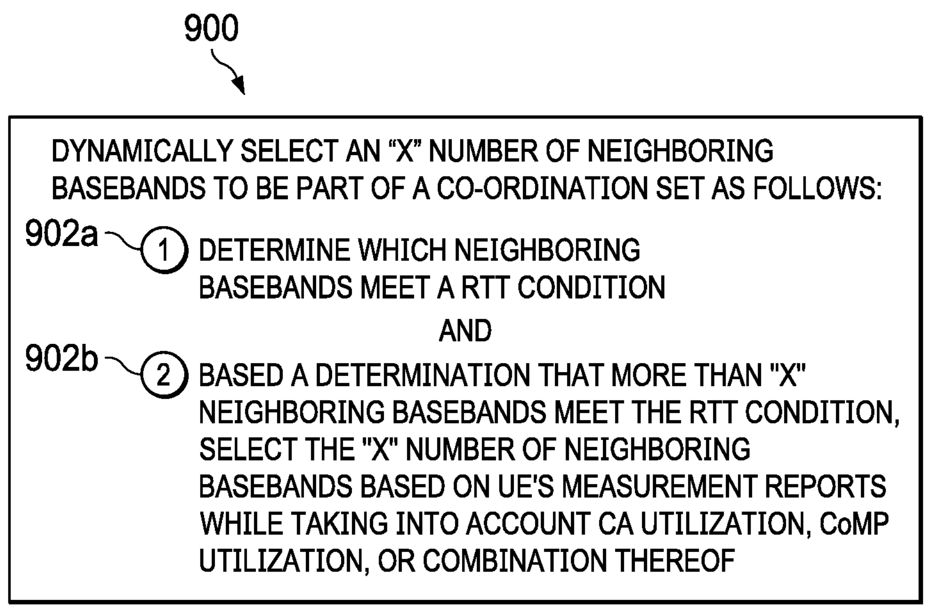
FIG. 9 is a flowchart of a method implemented in the source baseband shown in FIG. 5 in accordance with an embodiment of the present disclosure.

Referring to FIG. 9, there is a flowchart of a method 900 implemented in a source baseband 502$_1$ (for example) to dynamically select an "X" number (e.g., six) of neighboring basebands 502$_2$, 502$_3$, 502$_4$, 502$_5$, 502$_6$ . . . 502$_n$ to be part of a co-ordination in accordance with an embodiment of the present disclosure. At step 902, the source baseband 502$_1$ dynamically selects an "X" number (e.g., six) of neighboring basebands 502$_2$, 502$_3$, 502$_4$, 502$_5$, 502$_6$ . . . 502$_n$ to be part of an co-ordination as follows: (1) determine which of the neighboring basebands 502$_2$, 502$_3$, 502$_4$, 502$_5$, 502$_6$ . . . 502$_n$ meet a round trip time (RTT) condition, where the RTT condition is met for a specific one of the neighboring basebands 502$_2$, 502$_3$, 502$_4$, 502$_5$, 502$_6$ . . . 502$_n$ when signaling between the source baseband 502$_1$ and the specific one of the neighboring basebands 502$_2$, 502$_3$, 502$_4$, 502$_5$, 502$_6$ . . . 502$_n$ is less than a predetermined time (e.g., 60 μseconds) (see step 902*a*); and (2) based on a determination that there are more than the predetermined number (e.g., six) of neighboring basebands 502$_2$, 502$_3$, 502$_4$, 502$_5$, 502$_6$ . . . 502$_n$ which satisfy the RTT condition, select the predetermined number (e.g., six) of neighboring basebands 502$_2$, 502$_3$, 502$_4$, 502$_5$, 502$_6$ . . . 502$_n$ based on measurement reports 514, 516, and 518 (only three shown) received from UEs 520, 522, and 524 (only three shown) while taking into account at least one of a Carrier Aggregation (CA) utilization and Coordinated Multipoint (CoMP) utilization (see step 902*b*). It should be appreciated that each baseband 502$_1$, 502$_2$, 502$_3$, 502$_4$, 502$_5$, 502$_6$ . . . 502$_n$ would perform method 900 to come up with the list of their respective most optimal neighboring basebands to be part of their respective co-ordination set. As shown in FIG. 5, each baseband 502$_1$, 502$_2$, 502$_3$, 502$_4$, 502$_5$, 502$_6$ . . . 502$_n$ along with the L2 switch 512 can be located in the hub 510 where a physical connection can exist between any of the basebands 502$_1$, 502$_2$, 502$_3$ . . . 502$_n$ via the L2 switch 512.

Figure 10:
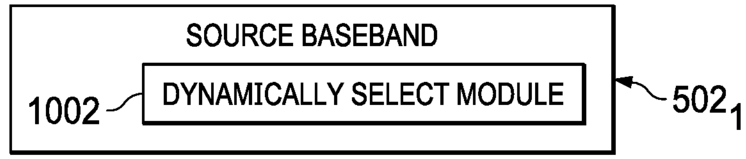
FIG. 10 is a block diagram illustrating a structure of the source baseband shown in FIG. 5 in accordance with an embodiment of the present disclosure.

Referring to FIG. 10, there is a block diagram illustrating structures of an exemplary source baseband 502$_1$ in accordance with an embodiment of the present disclosure. In one embodiment, the source baseband 502$_1$ comprises a dynamically select module 100$_2$. The dynamically select module 100$_2$ is configured to dynamically select an "X" number (e.g., six) of neighboring basebands 502$_2$, 502$_3$, 502$_4$, 502$_5$, 502$_6$ . . . 502$_n$ to be part of an co-ordination as follows: (1) determine which of the neighboring basebands 502$_2$, 502$_3$, 502$_4$, 502$_5$, 502$_6$ . . . 502$_n$ meet a round trip time (RTT) condition, where the RTT condition is met for a specific one of the neighboring basebands 502$_2$, 502$_3$, 502$_4$, 502$_5$, 502$_6$ . . . 502$_n$ when signaling between the source baseband 502$_1$ and the specific one of the neighboring basebands 502$_2$, 502$_3$, 502$_4$, 502*s*, 502$_6$ . . . 502$_n$ is less than a predetermined time (e.g., 60 μseconds); and (2) based on a determination that there are more than the predetermined number (e.g., six) of neighboring basebands 502$_2$, 502$_3$, 502$_4$, 502$_5$, 502$_6$ . . . 502$_n$ which satisfy the RTT condition, select the predetermined number (e.g., six) of neighboring basebands 502$_2$, 502$_3$, 502$_4$, 502$_5$, 502$_6$ . . . 502$_n$ based on measurement reports 514, 516, and 518 (only three shown) received from UEs 520, 522, and 524 (only three shown) while taking into account at least one of a Carrier Aggregation (CA) utilization and Coordinated Multipoint (CoMP) utilization. It should be appreciated that the source baseband 502$_1$ also includes other components, modules or structures which are well-known, but for clarity, only the components, modules or structures needed to describe the features of the present disclosure are described herein. Further, it should also be appreciated that the other basebands 502$_2$, 502$_3$, 502$_4$, 502$_5$, 502$_6$ . . . 502$_n$ would also be configured as the baseband 502$_1$ such that each of the other basebands 502$_2$, 502$_3$, 502$_4$, 502$_5$, 502$_6$ . . . 502$_n$ can determine the list of their respective most optimal neighboring basebands to be part of their respective co-ordination set.

As those skilled in the art will appreciate, the above-described module 100$_2$ of the baseband 502$_1$ may be implemented as one or more dedicated circuits. Further, the module 100$_2$ can also be implemented using any number of dedicated circuits through functional combination or separation. In some embodiments, the module 100$_2$ may be even be implemented in a single application specific integrated circuit (ASIC). As an alternative software-based implementation, the baseband $502_1$ may comprise a processor $100_4$ (including but not limited to a microprocessor, a microcontroller or a Digital Signal Processor (DSP), etc.), and a memory $100_6$ (see FIG. 5). The memory $100_6$ stores machine-readable program code executable by the processor $100_4$ to cause the baseband $502_1$ to perform the steps of the above-described method 900.

Figure 11:
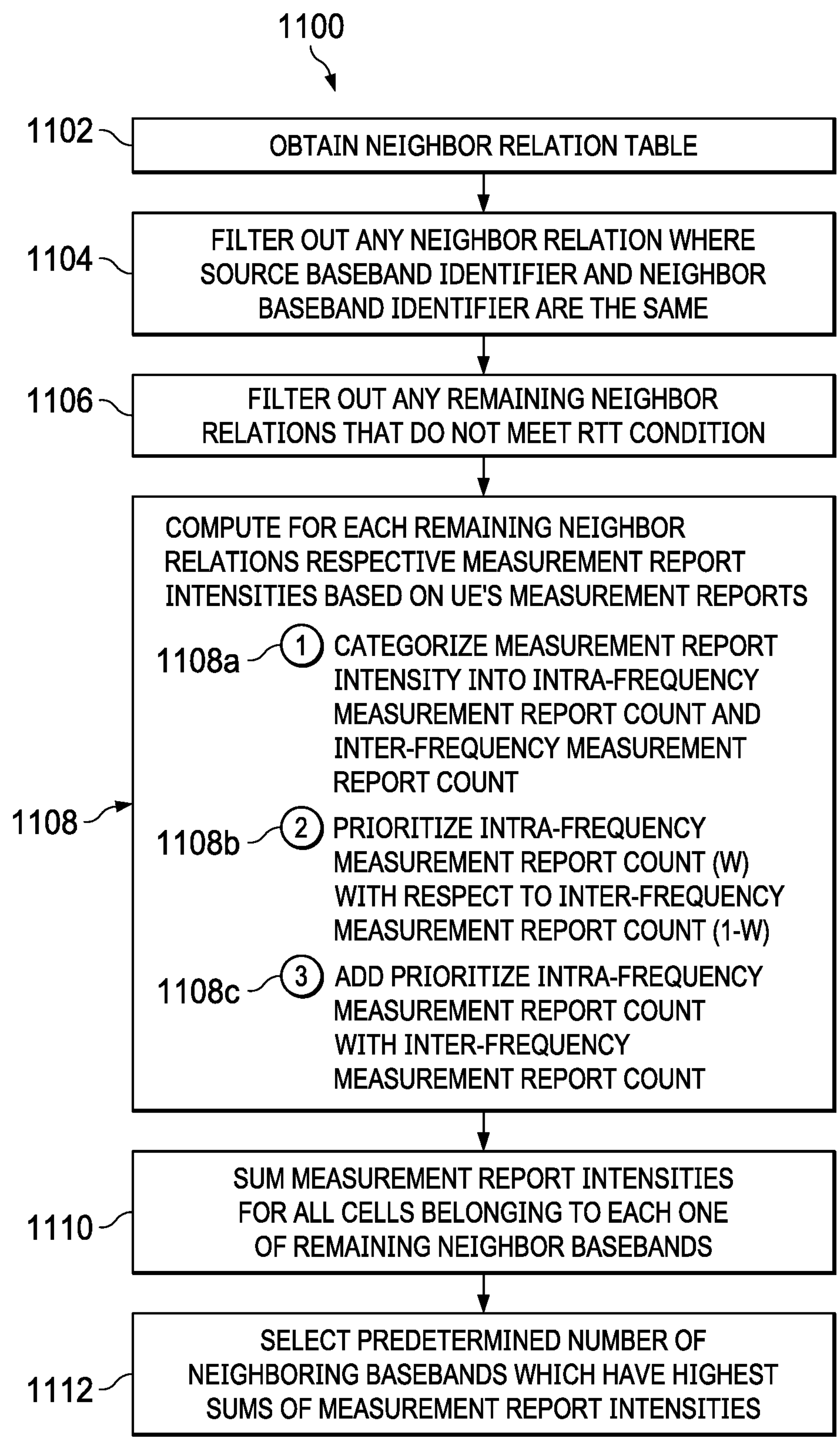
FIG. 11 is a flowchart of a method implemented in the source baseband shown in FIG. 5 in accordance with an embodiment of the present disclosure; and, FIG. 12 is a block diagram illustrating a structure of the source baseband shown in FIG. 5 in accordance with an embodiment of the present disclosure.

Referring to FIG. 11, there is a flowchart of a method 1100 implemented in a source baseband $502_1$ (for example) to dynamically select an "X" number (e.g., six) of neighboring basebands $502_2$, $502_3$, $502_4$, $502_5$, $502_6$ . . . $502_n$ to be part of a co-ordination in accordance with an embodiment of the present disclosure. At step 1102, the source baseband $502_1$ obtains a neighbor relation table 600, wherein the neighbor relation table 600 comprises a plurality of rows $602_1$, $602_2$, $602_3$ . . . $602_n$ of neighbor relations and each neighbor relation row $602_1$, $602_2$, $602_3$ . . . $602_n$ includes: (i) a source baseband identifier 604; (ii) a source baseband cell identifier 606; (iii) a neighbor baseband identifier 608; (iv) a neighbor baseband cell identifier 610; (v) a RTT value 612; and (vi) a measurement report intensity 614 (see FIG. 6A). At step 1104, the source baseband $502_1$ filters out any of the neighbor relations in which the source baseband identifier 604 and the neighbor baseband identifier 608 are the same (see FIG. 6B). At step 1106, the source baseband $502_1$ filters out any of the remaining neighbor relations $602_1$, $602_2$, $602_{20}$, $602_{21}$, $602_{n-3}$ and $602_{n-4}$ that do not meet a RTT condition (note: to meet the RTT condition the signaling between the source baseband $502_1$ and each one of the remaining neighboring baseband $502_2$, $502_3$, $502_4$, $502_5$, $502_6$ . . . $502_n$ is less than a predetermined time (e.g., 60 µseconds)) (see FIG. 6C). At step 1108, the source baseband $502_1$ computes for each of the remaining neighbor relations $602_3$ $602_{22}$, $602_{n-1}$ and $602_n$ which meet the RTT condition their respective measurement report intensities 614 based at least in part on a number of the measurement reports 514, 516, 518, 519, 521 received from the plurality of UEs 520, 522, 524, 526, 528 (see FIG. 6D1). In one example, the source baseband $502_1$ can implement step 1108 to compute for each of the remaining neighbor relations $602_3$ $602_{22}$, $602_{n-1}$ and $602_n$ which meet the RTT condition their respective measurement report intensities 614 as follows: (a) categorize the measurement report intensity 614 into (i) a first count associated with a number of the received measurement reports 514, 516, 518, 519, 521 that are based on intra-frequency measurements to account for the CoMP utilization, and (ii) a second count associated with a number of the received measurement reports 514, 516, 518, 519, 521 that are based on inter-frequency measurements to account for the CA utilization (step 1108_a_)(see FIG. 6D3); (b) prioritize the first count and the second count by using a weight parameter "w" with a range of [0 . . . 1], wherein the first account is multiplied with "w" and the second count is multiplied by "(1−w)" (step 1108_b_); and (c) add the weighted first count and the weighted second count to obtain the computed measurement report intensity 614 (step 1108_c_)(see FIG. 6D4). At step 1110, the source baseband $502_1$ sums the measurement report intensities 614 together for all cells belonging to each one of the remaining neighbor basebands $602_3$ $602_{22}$, $602_{n-1}$ and $602_n$, wherein each remaining neighbor baseband $602_3$ $602_{22}$, $602_{n-1}$ and $602_n$ has a corresponding summed measurement report intensity 614 (see FIGS. 6D2 and 6D4). At step 1112, the source baseband $502_1$ selects the predetermined number of neighboring basebands which have the highest sums of measurement report intensities 614. It should be appreciated that each baseband $502_1$, $502_2$, $502_3$, $502_4$, $502_5$, $502_6$ . . . $502_n$ would perform method 1100 to come up with the list of their respective most optimal neighboring basebands to be part of their respective co-ordination set. As shown in FIG. 5, each baseband $502_1$, $502_2$, $502_3$, $502_4$, $502_5$, $502_6$ . . . $502_n$ along with the L2 switch 512 can be located in the hub 510 where a physical connection can exist between each of the basebands $502_1$, $502_2$, $502_3$ . . . $502_n$ via the L2 switch 512.

Figure 12:
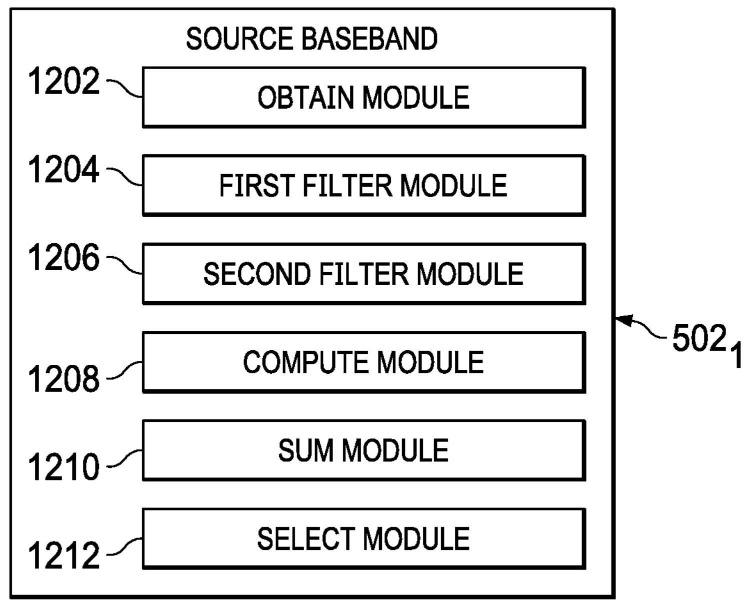

Referring to FIG. 12, there is a block diagram illustrating structures of an exemplary source baseband $502_1$ in accordance with an embodiment of the present disclosure. In one embodiment, the source baseband $502_1$ comprises an obtain module 1202, a first filter module 1204, a second filter module 1206, a compute module 1208, a sum module 1210, and a select module 1212. The obtain module 1202 is configured to obtain a neighbor relation table 600, wherein the neighbor relation table 600 comprises a plurality of rows $602_1$, $602_2$, $602_3$ . . . $602_n$ of neighbor relations and each neighbor relation row $602_1$, $602_2$, $602_3$ . . . $602_n$ includes: (i) a source baseband identifier 604; (ii) a source baseband cell identifier 606; (iii) a neighbor baseband identifier 608; (iv) a neighbor baseband cell identifier 610; (v) a RTT value 612; and (vi) a measurement report intensity 614 (see FIG. 6A). The first filter module 1204 is configured to filter out any of the neighbor relations in which the source baseband identifier 604 and the neighbor baseband identifier 608 are the same (see FIG. 6B). The second filter module 1206 is configured to filter out any of the remaining neighbor relations $602_1$, $602_2$, $602_{20}$, $602_{21}$, $602_{n-3}$ and $602_{n-4}$ that do not meet a RTT condition (note: to meet the RTT condition the signaling between the source baseband $502_1$ and each one of the remaining neighboring baseband $502_2$, $502_3$, $502_4$, $502_5$, $502_6$ . . . $502_n$ is less than a predetermined time (e.g., 60 µseconds)) (see FIG. 6C). The compute module 1208 is configured to compute for each of the remaining neighbor relations $602_3$ $602_{22}$, $602_{n-1}$ and $602_n$ which meet the RTT condition their respective measurement report intensities 614 based at least in part on a number of the measurement reports 514, 516, 518, 519, 521 received from the plurality of UEs 520, 522, 524, 526, 528 (see FIG. 6D1). In one example, the compute module 1208 can be configured to compute for each of the remaining neighbor relations $602_3$ $602_{22}$, $602_{n-1}$ and $602_n$ which meet the RTT condition their respective measurement report intensities 614 as follows: (a) categorize the measurement report intensity 614 into (i) a first count associated with a number of the received measurement reports 514, 516, 518, 519, 521 that are based on intra-frequency measurements to account for the CoMP utilization, and (ii) a second count associated with a number of the received measurement reports 514, 516, 518, 519, 521 that are based on inter-frequency measurements to account for the CA utilization (see FIG. 6D3); (b) prioritize the first count and the second count by using a weight parameter "w" with a range of [0 . . . 1], wherein the first account is multiplied with "w" and the second count is multiplied by "(1−w)"; and (c) add the weighted first count and the weighted second count to obtain the computed measurement report intensity 614 (see FIG. 6D2). The sum module 1210 is configured to sum the measurement report intensities 614 together for all cells belonging to each one of the remaining neighbor basebands $602_3$ $602_{22}$, $602_{n-1}$ and $602_n$, wherein each remaining neighbor baseband $602_3$ $602_{22}$, $602_{n-1}$ and $602_n$ has a corresponding summed measurement report intensity 614 (see FIGS. 6D2 and 6D4). The select module 1212 is configured to select the predetermined number of neighboring basebands which have the highest sums of measurement report intensities 614. It should be appreciated that each baseband 502$_1$, 502$_2$, 502$_3$, 502$_4$, 502$_5$, 502$_6$ . . . 502$_n$ would perform method 1100 to come up with the list of their respective most optimal neighboring basebands to be part of their respective co-ordination set. It should be appreciated that the source baseband 502$_1$ also includes other components, modules or structures which are well-known, but for clarity, only the components, modules or structures needed to describe the features of the present disclosure are described herein. Further, it should also be appreciated that the other basebands 502$_2$, 502$_3$, 502$_4$, 502$_5$, 502$_6$ . . . 502$_n$ would also be configured as the baseband 502$_1$ such that each of the other basebands 502$_2$, 502$_3$, 502$_4$, 502*s*, 502$_6$ . . . 502$_n$ can come up with the list of their respective most optimal neighboring basebands to be part of their respective co-ordination set.

As those skilled in the art will appreciate, the above-described modules 1202, 1204, 1206, 1208, 1210, and 1212 of the source baseband 502$_1$ may be implemented separately as suitable dedicated circuits. Further, the modules 1202, 1204, 1206, 1208, 1210, and 1212 can also be implemented using any number of dedicated circuits through functional combination or separation. In some embodiments, the modules 1202, 1204, 1206, 1208, 1210, and 1212 may be even combined in a single application specific integrated circuit (ASIC). As an alternative software-based implementation, the source baseband 502$_1$ may comprise a processor 100$_4$ (including but not limited to a microprocessor, a microcontroller or a Digital Signal Processor (DSP), etc.), and a memory 100$_6$ (see FIG. 5). The memory 100$_6$ stores machine-readable program code executable by the processor 100$_4$ to cause the source baseband 502$_1$ to perform the steps of the above-described method 1100.

In view of the foregoing, there is disclosed a baseband 502$_1$ (source baseband 502$_1$) which is configured to dynamically select an "X" number (e.g., six) of neighboring basebands 502$_2$, 502$_3$, 502$_4$, 502$_5$, 502$_6$ . . . 502$_n$ to be part of an co-ordination set as follows: (1) determine which of the neighboring basebands 502$_2$, 502$_3$, 502$_4$, 502$_5$, 502$_6$ . . . 502$_n$ that meet a round trip time (RTT) condition where signaling between the source baseband 502$_1$ and the corresponding neighboring baseband 502$_2$, 502$_3$, 502$_4$, 502$_5$, 502$_6$ . . . 502$_n$ is less than a predetermined time (e.g., 60 µseconds); and (2) based on a determination that there are more than the predetermined number (e.g., six) of neighboring basebands 502$_2$, 502$_3$, 502$_4$, 502$_5$, 502$_6$ . . . 502$_n$ which satisfy the RTT condition, select the predetermined number (e.g., six) of neighboring basebands 502$_2$, 502$_3$, 502$_4$, 502$_5$, 502$_6$ . . . 502$_n$ based on measurement reports 514, 516, 518, 519, 521 received from UEs 520, 522, 524, 526, 528 while taking into account at least one of a CA utilization and CoMP utilization. The present disclosure details an improvement over the prior art in which the traditional source baseband had its co-ordination set of neighboring basebands manually selected by a user (operator). The presently disclosure proposes to change the prior art's manual selection scheme to an automated dynamic scheme where the source baseband's co-ordination set of neighboring basebands is selected and updated, based on actual measurement reports received from UEs 520, 522, 524 so that the co-ordination set can be automatically changed due to changing traffic patterns, and that the co-ordination set is the most optimal with respect to CA utilization, CoMP utilization or a combination thereof.

The present disclosure addresses many problems associated with the prior art's manual selection scheme where the co-ordination set was manually created only after a lot of work is done by engineers to formulate the co-ordination set. Then, if there are any changes to the network that affect radio coverage (i.e. cell add, site add, tilt changes, power changes), the interference between cells will change which would necessitate per the prior art's manual selection scheme a manual updating of the co-ordination set which will take many man hours to complete where such network changes can be easily and effectively addressed by the automated dynamic scheme of the present disclosure. Further, if there is any change in the transport network and the RTT time between basebands changes, then the co-ordination set will need per the prior art's manual selection scheme to be manually updated which will take many man hours to complete where such changes can be easily and effectively addressed by the automated dynamic scheme of the present disclosure.

In the above-description of various embodiments of the present disclosure, it is to be understood that the terminology used herein is for the purpose of describing particular embodiments only and is not intended to be limiting of the disclosure. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

The tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present disclosure may be embodied in hardware and/or in software (including firmware, resident software, micro-code, etc.) that runs on a processor or controller, which may collectively be referred to as "circuitry," "a module" or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Furthermore, although some of the diagrams include arrows on communication paths to show a primary direction of communication, it is to be understood that communication may occur in the opposite direction relative to the depicted arrows. Finally, other blocks may be added/inserted between the blocks that are illustrated.

It should therefore be clearly understood that the order or sequence of the acts, steps, functions, components or blocks illustrated in any of the flowcharts depicted in the drawing Figures of the present disclosure may be modified, altered, replaced, customized or otherwise rearranged within a particular flowchart, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present patent disclosure.

Of course, the present disclosure may be carried out in other specific ways than those herein set forth without departing from the scope and essential characteristics of the disclosure. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Furthermore, at least a portion of an example network architecture disclosed herein may be virtualized as set forth above and architected in a cloud-computing environment comprising a shared pool of configurable virtual resources. Skilled artisans will also appreciate that such a cloud-computing environment may comprise one or more of private clouds, public clouds, hybrid clouds, community clouds, distributed clouds, multiclouds and interclouds (e.g., "cloud of clouds", and the like.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the scope of the present disclosure.

Although multiple embodiments of the present disclosure have been illustrated in the accompanying Drawings and described in the foregoing Detailed Description, it should be understood that the invention is not limited to the disclosed embodiments, but instead is also capable of numerous rearrangements, modifications and substitutions without departing from the present disclosure that as has been set forth and defined within the following claims.

The invention claimed is:

1. A source baseband in a centralized radio access network (C-RAN), the source baseband comprising:

a processor; and, a memory that stores processor-executable instructions, wherein the processor interfaces with the memory to execute the processor-executable instructions, whereby the source baseband is operable to:

dynamically select a predetermined number of neighboring basebands to be part of a co-ordination set by:

determining which of the neighboring basebands meet a round trip time (RTT) condition, where the RTT condition is met for one of the neighboring basebands when signaling between the source baseband and the one of the neighboring basebands is less than a predetermined time; and based on a determination that there are more than the predetermined number of neighboring basebands which satisfy the RTT condition, selecting the predetermined number of neighboring basebands based on measurement reports received from a plurality of user equipments (UEs) while taking into account at least one of a carrier aggregation (CA) utilization and a coordinated multi-point (CoMP) utilization, wherein each of the source baseband and at least one or more of the neighboring basebands controls a plurality of individual radio nodes at locations remote from the baseband.

2. The source baseband of claim 1, wherein the RTT condition is 60 μseconds and the predetermined number of neighboring basebands is six neighboring basebands.

3. The source baseband of claim 1, wherein the measurement reports further comprise at least one of (i) intra-frequency measurement reports which are associated with the CoMP utilization, and (ii) inter-frequency measurements which are associated with the CA utilization.

4. The source baseband of claim 3, wherein the source baseband is operable to pre-configure the UEs to send upon one or more conditions being met the intra-frequency measurement reports and to send upon one or more other conditions being met the inter-frequency measurement reports.

5. The source baseband of claim 1, wherein the source baseband is operable to select a certain percentage of UEs in the C-RAN to be the UEs which provide the measurement reports.

6. The source baseband of claim 1, wherein the source baseband is operable to filter a number of the measurement reports received during multiple recording output periods (ROPs) which comprise an evaluation period at an end of which the predetermined number of neighboring basebands are selected or re-selected.

7. The source baseband of claim 1, wherein the source baseband is operable to dynamically select the predetermined number of neighboring basebands by:

obtaining a neighbor relation table, wherein the neighbor relation table comprises a plurality of rows of neighbor relations and each neighbor relation row includes: (i) a source baseband identifier; (ii) a source baseband cell identifier; (iii) a neighbor baseband identifier; (iv) a neighbor baseband cell identifier; (v) a RTT value; and (vi) a measurement report intensity;

filtering out any of the neighbor relations in which the source baseband identifier and the neighbor baseband identifier are the same;

filtering out any of the remaining neighbor relations that do not meet the RTT condition;

computing for each of the remaining neighbor relations which meet the RTT condition their respective measurement report intensities based at least in part on a number of the measurement reports received from the plurality of UEs;

summing the measurement report intensities together for all cells belonging to each one of the remaining neighbor basebands, wherein each remaining neighbor baseband has a corresponding summed measurement report intensity; and, selecting the predetermined number of neighboring basebands which have the highest sums of measurement report intensities.

8. The source baseband of claim 7, wherein the source baseband is operable to compute for each of the remaining neighbor relations which meet the RTT condition their respective measurement report intensities by:

categorizing measurement report intensity into (i) a first count associated with a number of the received measurement reports that are based on intra-frequency measurements to account for the CoMP utilization, and (ii) a second count associated with a number of the received measurement reports that are based on inter-frequency measurements to account for the CA utilization;

prioritizing the first count and the second count by using a weight parameter "w" with a range of [0 . . . 1], wherein the first count is multiplied with "w" and the second count is multiplied by "(1−w)"; and adding the weighted first count and the weighted second count to obtain the computed measurement report intensity.

9. A method implemented by a source baseband in a centralized radio access network (C-RAN), the method comprising:

dynamically selecting a predetermined number of neighboring basebands to be part of a co-ordination set by:

determining which of the neighboring basebands meet a round trip time (RTT) condition, where the RTT condition is met for one of the neighboring basebands when signaling between the source baseband and the one of the neighboring basebands is less than a predetermined time; and based on a determination that there are more than the predetermined number of neighboring basebands which satisfy the RTT condition, selecting the predetermined number of neighboring basebands based on measurement reports received from a plurality of user equipments (UEs) while taking into account at least one of a carrier aggregation (CA) utilization and a coordinated multi-point (CoMP) utilization, wherein each of the source baseband and at least one or more of the neighboring basebands controls a plurality of individual radio nodes at locations remote from the baseband.

10. The method of claim 9, wherein the RTT condition is 60 μseconds and the predetermined number of neighboring basebands is six neighboring basebands.

11. The method of claim 10, wherein the measurement reports further comprise at least one of:

intra-frequency measurement reports which are associated with the CoMP utilization, and inter-frequency measurements which are associated with the CA utilization.

12. The method of claim 11, further comprising a step of pre-configuring the UEs to send upon one or more conditions being met the intra-frequency measurement reports and to send upon one or more other conditions being met the inter-frequency measurement reports.

13. The method of claim 9, further comprising a step of selecting a certain percentage of UEs in the C-RAN to be the UEs which provide the measurement reports.

14. The method of claim 9, further comprising a step of filtering a number of the measurement reports received during multiple recording output periods (ROPs) which comprise an evaluation period at an end of which the predetermined number of neighboring basebands are selected or re-selected.

15. The method of claim 9, wherein the step of dynamically selecting the predetermined number of neighboring basebands further comprises:

obtaining a neighbor relation table, wherein the neighbor relation table comprises a plurality of rows of neighbor relations and each neighbor relation row includes: (i) a source baseband identifier; (ii) a source baseband cell identifier; (iii) a neighbor baseband identifier; (iv) a neighbor baseband cell identifier; (v) a RTT value; and (vi) a measurement report intensity;

filtering out any of the neighbor relations in which the source baseband identifier and the neighbor baseband identifier are the same;

filtering out any of the remaining neighbor relations that do not meet the RTT condition;

computing for each of the remaining neighbor relations which meet the RTT condition their respective measurement report intensities based at least in part on a number of the measurement reports received from the plurality of UEs;

summing the measurement report intensities together for all cells belonging to each one of the remaining neighbor basebands, wherein each remaining neighbor baseband has a corresponding summed measurement report intensity; and, selecting the predetermined number of neighboring basebands which have the highest sums of measurement report intensities.

16. The method of claim 15, wherein the step of computing for each of the remaining neighbor relations which meet the RTT condition their respective measurement report intensities further comprises:

categorizing measurement report intensity into (i) a first count associated with a number of the received measurement reports that are based on intra-frequency measurements to account for the CoMP utilization, and (ii) a second count associated with a number of the received measurement reports that are based on inter-frequency measurements to account for the CA utilization;

prioritizing the first count and the second count by using a weight parameter "w" with a range of [0 . . . 1], wherein the first count is multiplied with "w" and the second count is multiplied by "(1−w)";

adding the weighted first count and the weighted second count to obtain the computed measurement report intensity.

17. A hub in a centralized radio access network (C-RAN), the hub comprising:

a switch; and a plurality of basebands, each one of the basebands is connected to the switch, each one of the basebands is considered a source baseband while the remaining basebands are considered neighboring basebands, and each one of the source basebands is configured to:

control a plurality of individual radio nodes at locations remote from the source baseband;

dynamically select a predetermined number of neighboring basebands to be part of a co-ordination set by:

determining which of the neighboring basebands meet a round trip time (RTT) condition, where the RTT condition is met for one of the neighboring basebands when signaling between the source baseband and the one of the neighboring basebands is less than a predetermined time; and based on a determination that there are more than the predetermined number of neighboring basebands which satisfy the RTT condition, selecting the predetermined number of neighboring basebands based on measurement reports received from a plurality of user equipments (UEs) while taking into account at least one of a carrier aggregation (CA) utilization and a coordinated multi-point (CoMP) utilization.

18. The hub of claim 17, wherein each source baseband is operable to dynamically select the predetermined number of neighboring basebands by:

obtaining a neighbor relation table, wherein the neighbor relation table comprises a plurality of rows of neighbor relations and each neighbor relation row includes: (i) a source baseband identifier; (ii) a source baseband cell identifier; (iii) a neighbor baseband identifier; (iv) a neighbor baseband cell identifier; (v) a RTT value; and (vi) a measurement report intensity;

filtering out any of the neighbor relations in which the source baseband identifier and the neighbor baseband identifier are the same;

filtering out any of the remaining neighbor relations that do not meet the RTT condition;

computing for each of the remaining neighbor relations which meet the RTT condition their respective measurement report intensities based at least in part on a number of the measurement reports received from the plurality of UEs;

summing the measurement report intensities together for all cells belonging to each one of the remaining neighbor basebands, wherein each remaining neighbor baseband has a corresponding summed measurement report intensity; and selecting the predetermined number of neighboring basebands which have the highest sums of measurement report intensities.

19. The hub of claim 18, wherein the source baseband is operable to compute for each of the remaining neighbor relations which meet the RTT condition their respective measurement report intensities by:

categorizing measurement report intensity into (i) a first count associated with a number of the received measurement reports that are based on intra-frequency measurements to account for the CoMP utilization, and (ii) a second count associated with a number of the received measurement reports that are based on inter-frequency measurements to account for the CA utilization;

prioritizing the first count and the second count by using a weight parameter "w" with a range of [0 . . . 1], wherein the first count is multiplied with "w" and the second count is multiplied by "(1−w)";

adding the weighted first count and the weighted second count to obtain the computed measurement report intensity.

20. The hub of claim 17, wherein the RTT condition is 60 μseconds, and the predetermined number of neighboring basebands is six neighboring basebands.

* * * * *

UNITED STATES PATENT AND TRADEMARK OFFICE

CERTIFICATE OF CORRECTION

PATENT NO. : 11,483,745 B2
APPLICATION NO. : 16/956136
DATED : October 25, 2022
INVENTOR(S) : Singh et al.

It is certified that error appears in the above-identified patent and that said Letters Patent is hereby corrected as shown below:

In the Specification

In Column 18, Line 29, delete "module $100_{2.}$" and insert -- module 1002. --, therefor.

In Column 18, Lines 29-30, delete "module $100_2$" and insert -- module 1002 --, therefor.

In Column 18, Line 39, delete "$502_s$," and insert -- $502_5$, --, therefor.

In Column 18, Line 62, delete "module $100_2$" and insert -- module 1002 --, therefor.

In Column 18, Line 64, delete "module $100_2$" and insert -- module 1002 --, therefor.

In Column 18, Line 66, delete "module $100_2$" and insert -- module 1002 --, therefor.

In Column 19, Line 2, delete "processor $100_4$" and insert -- processor 1004 --, therefor.

In Column 19, Line 5, delete "memory $100_6$" and insert -- memory 1006 --, therefor.

In Column 19, Line 5, delete "memory $100_6$" and insert -- memory 1006 --, therefor.

In Column 19, Lines 6-7, delete "processor $100_4$" and insert -- processor 1004 --, therefor.

In Column 20, Line 1, delete "$502_s$," and insert -- $502_5$, --, therefor.

In Column 21, Line 12, delete "$502_s$," and insert -- $502_5$, --, therefor.

In Column 21, Line 26, delete "processor $100_4$" and insert -- processor 1004 --, therefor.

Signed and Sealed this
Eleventh Day of April, 2023

Katherine Kelly Vidal

Katherine Kelly Vidal
*Director of the United States Patent and Trademark Office*

In Column 21, Line 29, delete "memory $100_6$" and insert -- memory 1006 --, therefor.

In Column 21, Lines 30-31, delete "processor $100_4$" and insert -- processor 1004 --, therefor.